(12) United States Patent
Anand et al.

(10) Patent No.: US 10,014,904 B1
(45) Date of Patent: Jul. 3, 2018

(54) SYSTEM AND METHOD FOR MITIGATING CO-CHANNEL INTERFERENCE IN WHITE SPACE MODEMS

(71) Applicant: Saankhya Labs Pvt. Ltd., Bangalore (IN)

(72) Inventors: Sudeep Mirpadi Anand, Thrissur (IN); Shrinivas Subramania Bhat, Bangalore (IN); Anindya Saha, Bangalore (IN)

( * ) Notice: Subject to any disclaimer, the term of this patent is extended or adjusted under 35 U.S.C. 154(b) by 0 days.

(21) Appl. No.: 15/700,342

(22) Filed: Sep. 11, 2017

(30) Foreign Application Priority Data

Jul. 27, 2017 (IN) .............................. 201741026651

(51) Int. Cl.
| | |
|---|---|
| *H04B 17/00* | (2015.01) |
| *H04B 1/525* | (2015.01) |
| *H04L 5/14* | (2006.01) |
| *H04L 1/00* | (2006.01) |
| *H04L 5/00* | (2006.01) |
| *H04B 1/10* | (2006.01) |

(52) U.S. Cl.
CPC ........... *H04B 1/525* (2013.01); *H04L 1/0006* (2013.01); *H04L 5/1461* (2013.01); *H04B 1/1027* (2013.01); *H04L 5/0007* (2013.01); *H04L 5/143* (2013.01)

(58) Field of Classification Search
CPC ........... H04B 1/1027; H04B 1/06; H04B 1/02
USPC ..................................................... 455/67.13
See application file for complete search history.

(56) References Cited

U.S. PATENT DOCUMENTS

| | | | | |
|---|---|---|---|---|
| 7,263,143 | B1* | 8/2007 | Rothaar | H03G 3/3052 375/345 |
| 7,369,484 | B1* | 5/2008 | Prismantas | H04B 1/1027 370/201 |
| 7,801,490 | B1* | 9/2010 | Scherzer | H04B 17/382 370/328 |
| 8,032,086 | B2* | 10/2011 | Waltho | H04W 52/16 370/318 |
| 8,170,577 | B2* | 5/2012 | Singh | H04W 4/20 370/329 |

(Continued)

*Primary Examiner* — April G Gonzales
(74) *Attorney, Agent, or Firm* — The Law Office of Austin Bonderer, PC; Austin Bonderer

(57) ABSTRACT

Disclosed is a system for mitigating co-channel interference (CCI) caused due to narrow multiband signal in white space (WS) modems. The system includes a base-station that includes a base-station transmitter and a base-station receiver. The base-station receiver receives an orthogonal frequency division multiplexing signal (OFDM) from one or more customer premises equipment (CPE) transmitters. An interference detection module detects a presence of co-channel interference in carriers of the OFDM signal and determines co-channel interference affected carriers. A dynamic notch filter module receives the central interference carriers from interference detection module and mitigates the co-channel interference of co-channel interference affected carriers without affecting frame detection capability of the system. The base-station transmitter includes an interference aware frequency interleaver that spreads co-channel interference affected carriers based on interference specific interleaving parameters and frequency de-interleaving is performed corresponding to frequency interleaving in the base-station receiver.

24 Claims, 20 Drawing Sheets

(56) References Cited

U.S. PATENT DOCUMENTS

| | | | | |
|---|---|---|---|---|
| 8,315,571 B2 * | 11/2012 | Lindoff | H04W 16/14 | 455/62 |
| 8,442,440 B2 * | 5/2013 | Memik | H04B 17/382 | 455/423 |
| 8,526,974 B2 * | 9/2013 | Olsson | G01S 5/0205 | 370/328 |
| 8,600,312 B2 * | 12/2013 | Quan | H04L 27/0006 | 370/342 |
| 8,812,037 B2 * | 8/2014 | Kim | H04L 27/0006 | 455/114.2 |
| 8,942,703 B2 * | 1/2015 | Jo | H04W 16/14 | 455/414.1 |
| 2009/0190541 A1 * | 7/2009 | Abedi | H04W 16/10 | 370/329 |
| 2010/0142463 A1 * | 6/2010 | Hu | H04L 5/0032 | 370/329 |
| 2010/0309317 A1 * | 12/2010 | Wu | H04W 16/14 | 348/180 |
| 2011/0124291 A1 * | 5/2011 | Gurney | H04W 16/14 | 455/63.2 |
| 2011/0176644 A1 * | 7/2011 | Sadek | H03G 3/3052 | 375/345 |
| 2011/0222493 A1 * | 9/2011 | Mangold | H04B 1/0475 | 370/329 |
| 2012/0108179 A1 * | 5/2012 | Kasslin | H04W 16/14 | 455/67.13 |
| 2012/0322390 A1 * | 12/2012 | Muraoka | H04W 16/14 | 455/67.13 |
| 2012/0329403 A1 * | 12/2012 | Muraoka | H04W 16/14 | 455/67.13 |
| 2013/0012138 A1 * | 1/2013 | Zhang | H04W 16/14 | 455/67.13 |
| 2015/0003226 A1 * | 1/2015 | Bernard | H04W 24/08 | 370/210 |
| 2015/0296413 A1 * | 10/2015 | Sadek | H04B 1/1027 | 375/348 |
| 2016/0183268 A1 * | 6/2016 | Albano | H04L 12/2634 | 370/252 |
| 2016/0277050 A1 * | 9/2016 | Kato | H04B 7/08 | |
| 2017/0208474 A1 * | 7/2017 | Mody | H04W 16/14 | |
| 2017/0243139 A1 * | 8/2017 | Dzierwa | G06N 99/005 | |

* cited by examiner

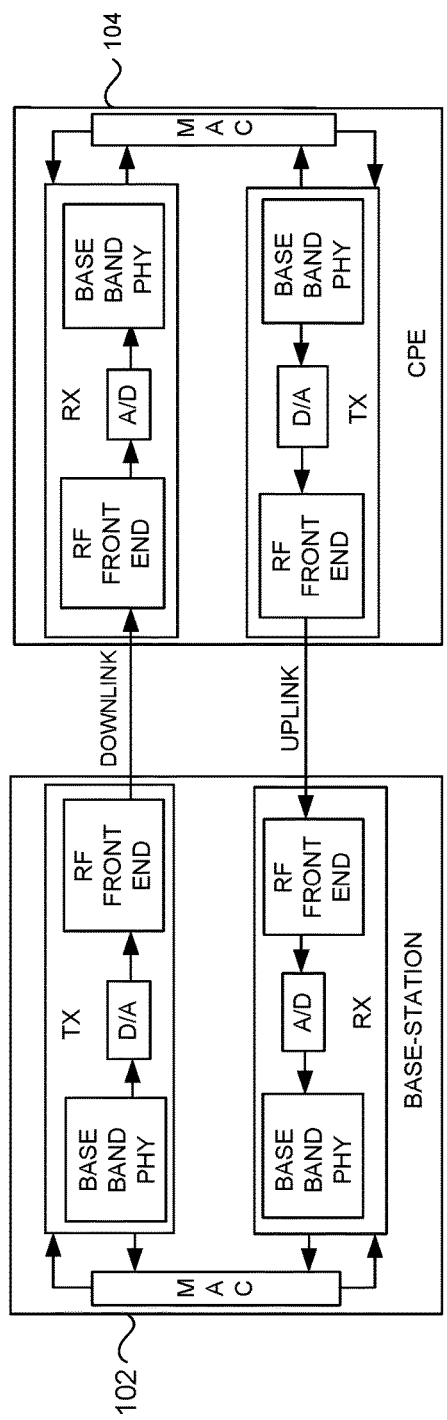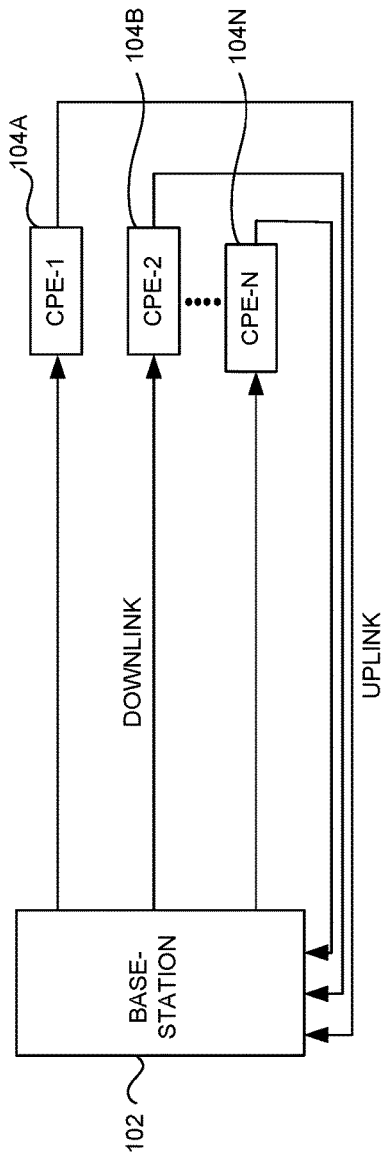
FIG. 1A
FIG. 1B

SYSTEM AND METHOD FOR MITIGATING CO-CHANNEL INTERFERENCE IN WHITE SPACE MODEMS

CROSS-REFERENCE TO RELATED APPLICATIONS

This application claims priority to Indian patent application no. 201741026651 filed on Jul. 27, 2017, the complete disclosure of which, in its entirely, is herein incorporated by reference.

BACKGROUND

Technical Field

The embodiments herein generally relate to white space modems, and more particularly, to system and method to mitigate co-channel interference caused due to narrow multiband signal in white space modems.

Description of the Related Art

Typically, white space (WS) modems are modems based on cognitive radio techniques for opportunistic use of radio frequency (RF) spectrum for wireless broad band applications. The white space refers to the unused broadcasting frequencies in the wireless spectrum. For example, television (TV) networks in UHF/VHF bands include a lot of unused white spaces which have been mainly freed up due to migration from analog to digital TV transmissions. While operating in the UHF/VHF bands, co-channel interference may occur due to undesired and unlicensed narrowband signals, inadvertent multi-tone jammers and interferences from undesired neighbouring analog TV transmissions from a shared border etc. The co-channel interference may severely affect the performance of the white space modems. IEEE802.22 is an example of a standardized air interface in which unallocated frequency holes or gaps in a TV spectrum are used for data connectivity. The typical infrastructure includes a backhaul connected base-station (BS) which manages and connects to one or more customer premise equipments (CPE) via the air interface through antennas in Terrestrial TV (e.g. the UHF/VHF) bands. The transmitted data from the base-station is called a downlink transmission and the corresponding received data at the CPE is called a downlink reception. Similarly the transmitted data at the CPE and the received data at the BS are called an uplink transmission and an uplink reception correspondingly. FIG. 1A is a typical block diagram of various components of an overall communication link between a base-station 102 and a CPE 104 of the IEEE802.22 wireless regional area network (WRAN) system in accordance with an exemplary scenario. The block diagram includes a media access control (MAC) layer, a baseband physical (PHY) layer, an analog to digital converter, a digital to analog converter and RF front end. The MAC is typically responsible for co-existence, quality of service (QOS) support to one or more CPE's, regulation of medium access between CPE's by time division multiplexing (TDM)/orthogonal frequency-division multiple access (OFDMA)/demand assigned multiple access (DAMA) and other activities within a 802.22 cell. The baseband PHY is responsible for all digital signal processing, communication processing algorithms, waveform creation and channel coding aspects required for establishing the communication link between the BS 102 and the CPE's 104. The baseband PHY interacts with the MAC for the data and controls which are needed to be transmitted/received in entities called frames and super frame. Inter-conversion between a digital waveform from the baseband PHY to an analog waveform is achieved using data-converters (A/D and D/A converters) and subsequently to RF waveforms at the desired TV band through RF transceivers present at RF front end. FIG. 1B is a typical point to multi-point scenario illustrating communication between the base-station 104 and one or more CPE's 104A-N in accordance with an exemplary scenario.

FIGS. 2A & 2B illustrate block diagrams of baseband section of a typical downlink transmitter (a base-station transmitter) and an uplink transmitter (a CPE transmitter) respectively in accordance with an exemplary scenario. The block diagrams of the typical uplink and downlink transmitters include a channel coding processor 202, a mapper 204, a subcarrier allocator 206, a frequency interleaver 208, a pilot inserter 210, an inverse Fast Fourier Transform (IFFT) block 214, a cyclic prefix inserter 216 and a digital to analog converter (D/A) 218. The typical downlink transmitter further includes a preamble inserter 212. For the typical uplink and downlink transmitters, a binary data to be transmitted is transferred to the PHY layer from the MAC layer. The binary data (i.e. an input) is sent to the channel coding processor 202 that includes a data-scrambler, an encoder, a puncture, a bit interleaver. The encoded and interleaved data are mapped to data constellation using the subcarrier allocator 206. The mapped data is then interleaved using the frequency interleaver 208. The pilot inserter 210 allocates pilots for channel estimation. The subcarriers are combined together to perform the IFFT block 214 on the combined subcarriers for obtaining an OFDM symbol.

The cyclic prefix inserter 216 prevents intersymbol interference caused by the channel delay spread. The obtained OFDM symbols for time duration of $T_{frame}$ (e.g. 10 milliseconds) forms a frame. The Frame of $T_{frame}$ duration is divided into downlink section that includes downlink OFDM symbols and uplink section that includes uplink OFDM symbols. A frame in the downlink may include the first OFDM symbol reserved for frame preamble. A super-frame may include first two OFDM symbols reserved for a super-frame and a frame preamble. The preambles and the pilots are used for synchronization, channel estimation and tracking process at an OFDM symbols. The OFDM symbols are finally transferred to RF transmission modules through digital to analog (D/A) converter 218. Some samples in the frame are reserved to account for a transmit time gap (TTG), and a receive time gap (RTG) which compensate for radio turn around latency and transmit-receive switch over delays.

FIGS. 3A & 3B illustrate block diagrams of baseband section of a typical downlink receiver (a CPE receiver) and an uplink receiver (a base-station receiver) respectively in accordance with an exemplary scenario. The block diagrams of the typical uplink and the downlink receivers include an A/D converter 302, a cyclic prefix remover 304, a fast fourier transform (FFT) block 308, a pilot extraction block 310, a channel equalization block 312, a channel estimator 314, a signal to noise ratio (SNR) estimator 316, a frequency de-interleaver 318, a subcarrier de-allocator 320, a de-mapper 322 and a channel decoding processor 324. In the typical downlink and the uplink receiver, the received signal passes through the A/D converter 302. The cyclic prefix is removed from the digital signal by the cyclic prefix remover 304 and FFT transform is performed on the signal at the FFT block 308. The typical downlink receiver further includes a frame sync block 306 where synchronization is done. From the FFT block output, pilots are extracted by the pilot extraction block 310 which provides pilots for the channel estimator 314 to estimate channel response. The channel equalization block 312 performs equalization using this channel response. The frequency de-interleaver 318 de-interleaves corresponding to frequency interleaving done in the transmitter. From this de-interleaved output, data is extracted from sub-carriers by sub-carrier de-allocator 320 and de-mapped using the de-mapper 322 using SNR values obtained from the SNR estimator 316. The de-mapped data is sent to the channel decoding processor 324 which performs bit de-interleaving, de-puncturing, decoding and descrambling to obtain the binary bits which are then sent to MAC as received data.

The TV spectrum may be occupied by desired licensed TV bands or undesired narrow band signals, inadvertent multi-tone jammers, interferences from undesired neighbouring associated television (ATV) transmissions from a shared border and the like. In case of the incumbent, the TVWS modem may include the capability to evacuate the incumbent band and move to a new frequency by querying and verifying with a TVWS database. In case of an undesired occupant it may be undesired co-channel interference to the WRAN network. The disadvantages due to the co-channel interference are (a) synchronization failures in frame detection/preamble detection, estimation errors in carrier frequency offset and the like which may lead to failures in establishing the communication link between the base-station and the CPE hence a user is unable to connect to the network, (b) performance failures in the uplink and the downlink due to OFDM data carrier allocations in the narrow multi-band co-channel interferences (e.g. vision and audio of the ATV interference) which causes errors in interference affected portion of the spectrum and thus leads to a drop in data rates and (c) performance failures caused by a fixed point dynamic range impact due to multiband tone interference. Baseband algorithms for the signal processing chain of the receiver may be implemented using a fixed point arithmetic. There are fixed dynamic range and numerical bounds for the signal at various stages in the receiver chain. Due to the presence of interference, numerical bounds for the signal may get severely impacted demanding a higher dynamic range. This may severely reduce the data rate performance as well as demand higher fixed point precision thus increasing implementation complexity.

Accordingly, there remains a need for mitigating the co-channel interference caused due to the narrow multiband signal in the white space modems.

SUMMARY

In view of the foregoing, an embodiment herein provides a system for mitigating co-channel interference (CCI) caused due to narrow multiband signal in white space (WS) modems. The system includes a base-station that includes a base-station transmitter and a base-station receiver. The base-station receiver receives an orthogonal frequency division multiplexing signal (OFDM) from one or more customer premises equipment (CPE) transmitters. The base-station receiver includes an interference detection module and a dynamic notch filter module. The interference detection module detects a presence of the co-channel interference (CCI) in carriers of the OFDM signal and determines co-channel interference affected carriers by identifying central interference carriers corresponding to the co-channel interference affected carriers. The dynamic notch filter module (i) receives the central interference carriers from the interference detection module and (ii) mitigates the co-channel interference of the co-channel interference affected carriers without affecting frame detection capability by suppressing said interference power of said co-channel interference affected carriers. The co-channel interference is represented in the carriers using at least one of (i) a position, (ii) a spread or (iii) an interference power, of the co-channel interference affected carriers. The base-station transmitter includes an interference aware frequency interleaver that spreads the co-channel interference affected carriers based on interference specific interleaving parameters and frequency de-interleaving is performed corresponding to a frequency interleaving in the base-station receiver.

In one aspect, a system for mitigating co-channel interference (CCI) caused due to narrow multiband signal in white space (WS) modems is provided. The system includes one or more customer premises equipment (CPE) represented by one or more transmitters and one or more receivers. The one or more CPE receivers receive an orthogonal frequency division multiplexing signal (OFDM) from a base-station transmitter. The one or more CPE receivers include an interference detection module and a dynamic notch filter module. The interference detection module detects a presence of the co-channel interference (CCI) in carriers of the OFDM signal and determines co-channel interference affected carriers by identifying central interference carriers corresponding to the co-channel interference affected carriers. The dynamic notch filter module (i) receives the central interference carriers from the interference detection module and (ii) mitigates the co-channel interference of the co-channel interference affected carriers without affecting frame detection capability by suppressing the interference power of the co-channel interference affected carriers. The co-channel interference is represented in the carriers using at least one of (i) a position, (ii) a spread or (iii) an interference power, of the co-channel interference affected carriers. The one or more CPE transmitters include an interference aware frequency interleaver that spreads the co-channel interference affected carriers based on interference specific interleaving parameters and frequency de-interleaving is performed corresponding to a frequency interleaving in the one or more CPE receivers.

In another aspect, a method for mitigating co-channel interference (CCI) caused due to narrow multiband signal in white space (WS) modems for an uplink or a downlink is provided. The method includes following steps of: (a) receiving an orthogonal frequency division multiplexing signal (OFDM) from at least one of (i) one or more customer premises equipment (CPE) uplink transmitters or (ii) a base-station downlink transmitter; (b) detecting, using an interference detection module, a presence of the co-channel interference (CCI) in carriers of the OFDM signal and determining co-channel interference affected carriers; (c) receiving, using a dynamic notch filter module, the central interference carriers from the interference detection module; (d) mitigating, using the dynamic notch filter module, the co-channel interference of the co-channel interference affected carriers without affecting frame detection capability by suppressing the interference power of the co-channel interference affected carriers; and (e) spreading, using an interference aware frequency interleaver, the co-channel interference affected carriers based on interference specific interleaving parameters and performing frequency de-interleaving corresponding to a frequency interleaving in at least one of (i) a base-station uplink receiver or (ii) one or more CPE downlink receivers. The step detecting including a step of identifying central interference carriers corresponding to the co-channel interference affected carriers. The co-channel interference is represented in the carriers using at least one of (i) a position, (ii) a spread or (iii) an interference power, of the co-channel interference affected carriers.

The system for mitigating co-channel interference (CCI) in white space (WS) modems boosts the performance in the uplink and the downlink systems of the network by detecting the co-channel interference affected carriers of the spectrum. The system also detects the synchronization failures in a communication link between base-station and CPE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a typical block diagram of various components of an overall communication link between a base-station and a CPE of the IEEE802.22 wireless regional area network (WRAN) system in accordance with an exemplary scenario;

FIG. 1B is a typical point to multi-point scenario illustrating a communication between the base-station and the one or more CPEs in accordance with an exemplary scenario;

DETAILED DESCRIPTION OF PREFERRED EMBODIMENTS

Figure 2A:
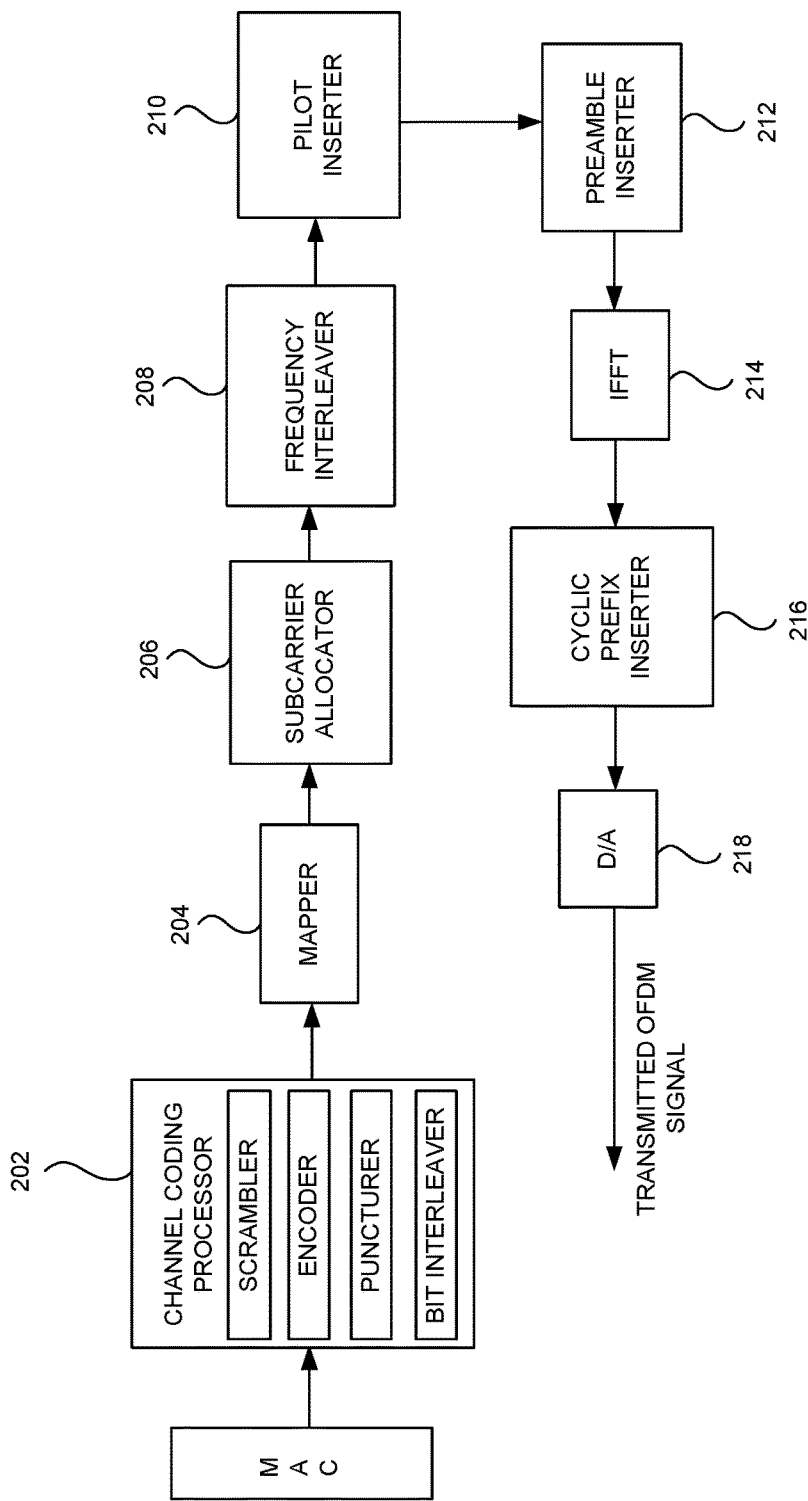
FIGS. 2A & 2B illustrate block diagrams of baseband section of a typical downlink transmitter (a base-station transmitter) and a uplink transmitter (a CPE transmitter) respectively in accordance with an exemplary scenario.
Figure 2B:
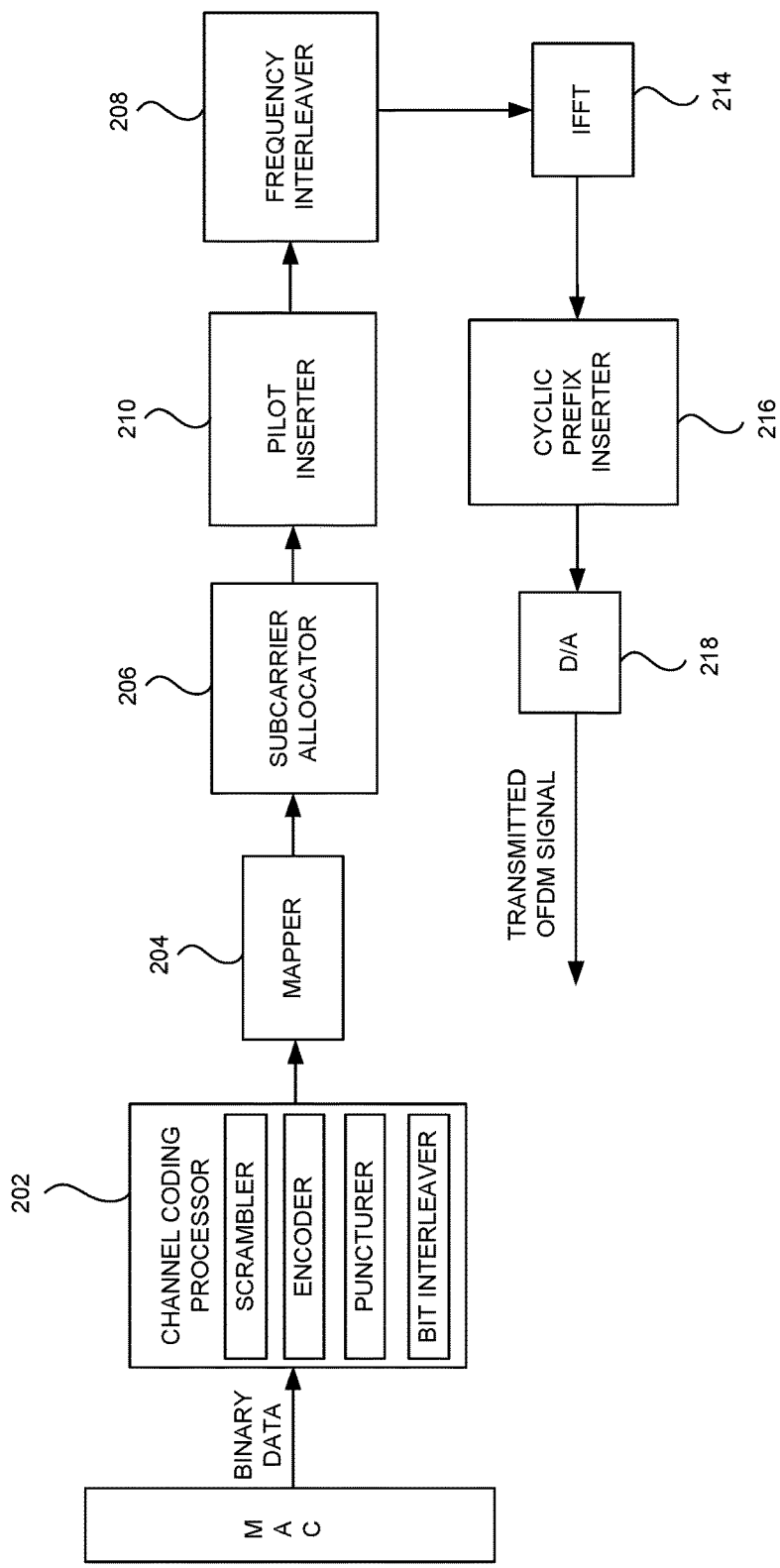
Figure 3A:
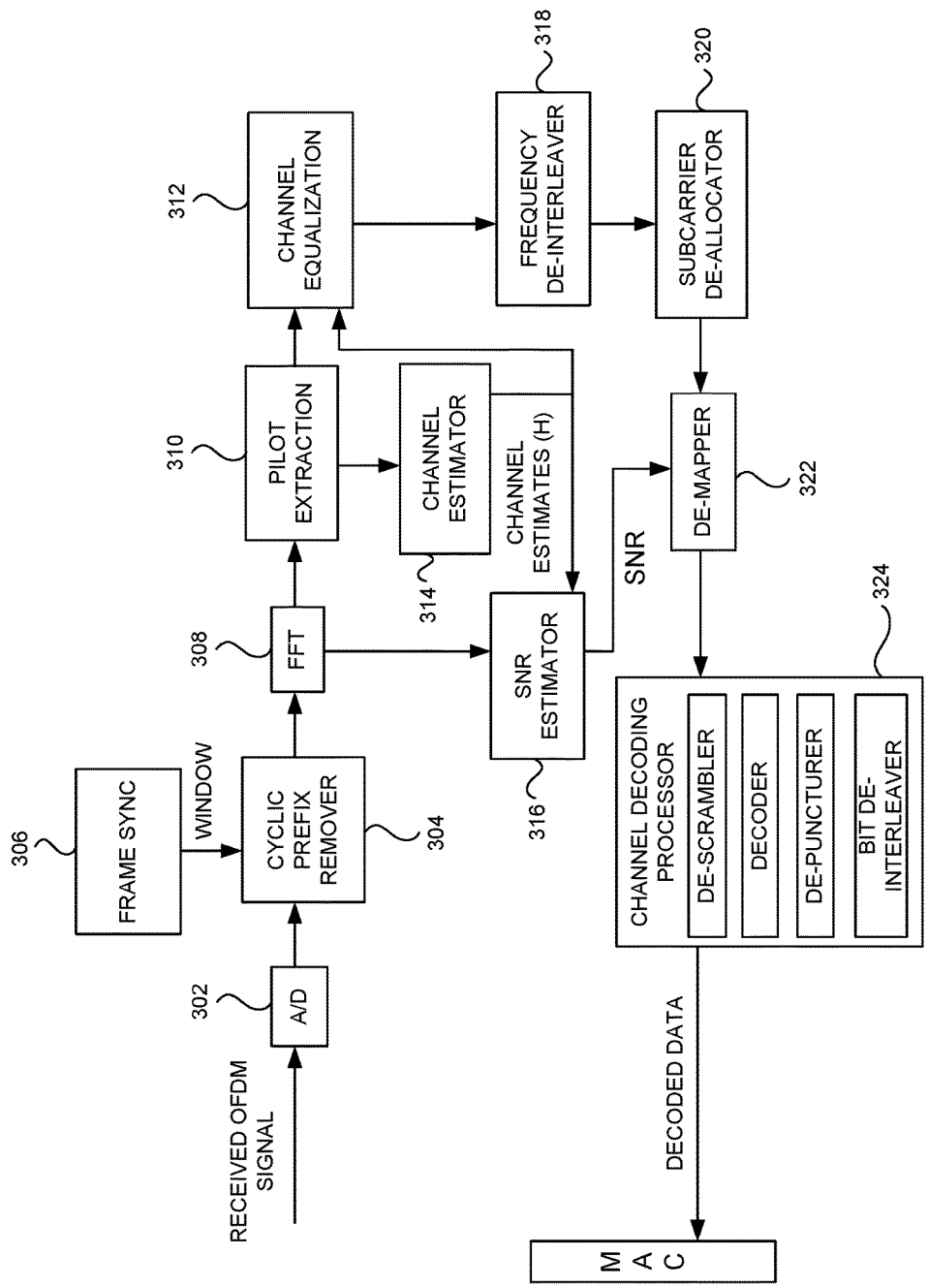
FIGS. 3A & 3B illustrate block diagrams of baseband section of a typical downlink receiver (a CPE receiver) and a uplink receiver (a base-station receiver) respectively in accordance with an exemplary scenario.
Figure 3B:
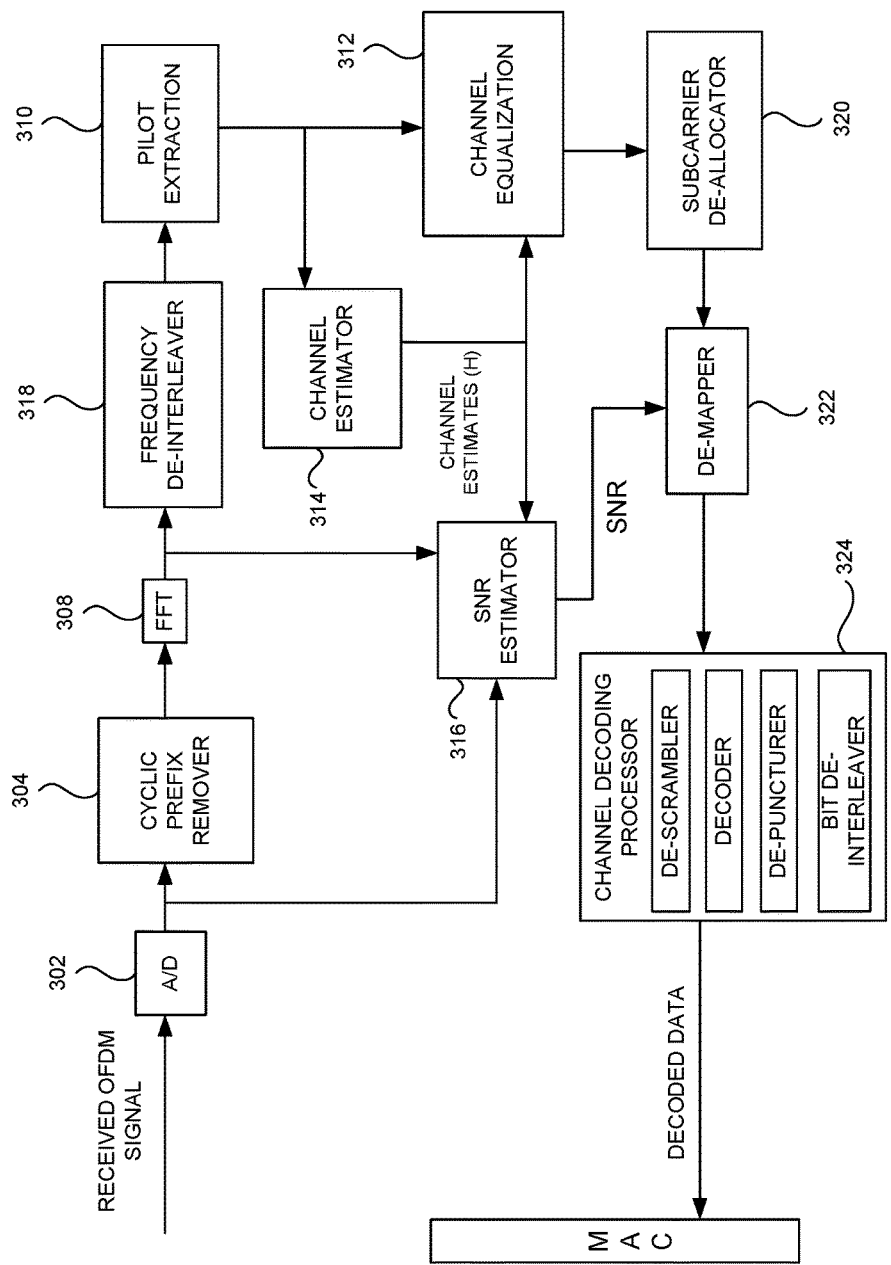

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to mitigate co-channel interference caused due to narrow multiband signal in white space modems. The embodiments herein achieve this by proposing the system where both base-station and customer premises equipment (CPE) detect the co-channel interference. The base-station and the CPE communicate the co-channel interference with each other which may aid in the mitigation of the co-channel interference at a receiver (for e.g. a base-station receiver or a CPE receiver). Referring now to the drawings, and more particularly to FIGS. 4 through 18, where similar reference characters denote corresponding features consistently throughout the figures, there are shown preferred embodiments.

Figure 4:
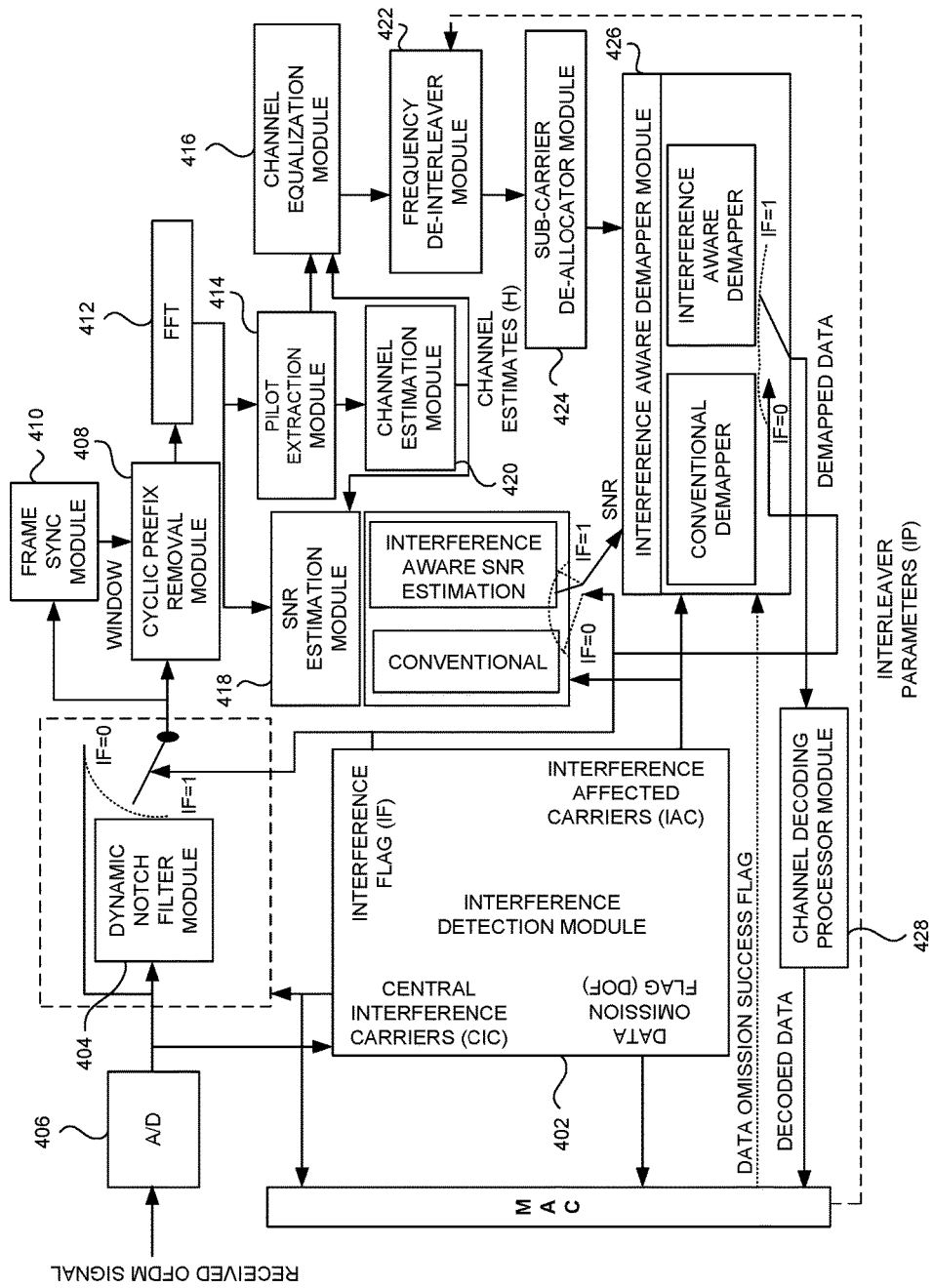
FIG. 4 illustrates a block diagram of baseband section for a baseband signal flow at a downlink receiver (a CPE receiver) with a co-channel interference rejection according to an embodiment herein.

FIG. 4 illustrates a block diagram of baseband section for a baseband signal flow at a downlink receiver (a CPE receiver) with a co-channel interference rejection according to an embodiment herein. The block diagram of the downlink receiver includes an interference detection module 402 and a dynamic notch filter module 404. The block diagram of the downlink receiver further includes an analog to digital (A/D) converter 406, a cyclic prefix removal module 408, a frame synchronization (SYNC) module 410, a fast fourier transform (FFT) 412, a pilot extraction module 414, a channel equalization module 416, a signal to noise ratio (SNR) estimation module 418, a channel estimation module 420, a frequency de-interleaver module 422, a subcarrier de-allocator module 424, an interference aware de-mapper module 426 and a channel decoding processor module 428. The interference detection module 402 detects the presence of co-channel interference (CCI) in carriers of an orthogonal frequency division multiplexing (OFDM) signal and determines co-channel interference affected carriers by identifying central interference carriers corresponding to the co-channel interference affected carriers. In an embodiment, the co-channel interference is represented in the carriers using at least one of (i) a position, (ii) a spread or (iii) an interference power, of the co-channel interference affected carriers. The dynamic notch filter module 404 receives the central interference carriers from the interference detection module 402. The dynamic notch filter module 404 further mitigates the co-channel interference of the co-channel interference affected carriers without affecting a frame detection capability of a system by suppressing the interference power of the co-channel interference affected carriers. Information about the central interference carriers is transmitted to the base-station for selecting appropriate frequency interleaving parameters at the base-station transmitter.

In an embodiment, a signal path with the co-channel interference is passing through the dynamic notch filter module 404 that is designed dynamically based on the information about the central interference carriers from (a) the interference detection module 402, (b) the cyclic prefix removal module 408, (c) the FFT 412 where an appropriate windowing is obtained from the frame synchronization module 410, (d) the pilot extraction module 414, (e) the channel estimation module 420, (f) the channel equalization module 416 where multipath effect from the data is removed, (g) the frequency de-interleaver module 422, (h) the sub-carrier de-allocator module 424 and (i) the interference aware de-mapper module 426. The frequency de-interleaver module 422 includes the frequency interleaving parameters which are transmitted from the base-station transmitter based on the co-channel interference. In an embodiment, the interference aware de-mapper module 426 uses separate SNR estimations at the co-channel interference affected carriers and uses a multi-threshold softening/scaling on a conventional de-mapper results. Finally, the channel decoding processor module 428 includes a bit de-interleaving, de-puncturing, Viterbi decoder and de-scrambling for decoding the data. In an embodiment, the interference aware de-mapper module 426 includes a conventional de-mapper and an interference aware de-mapper.

Figure 5:
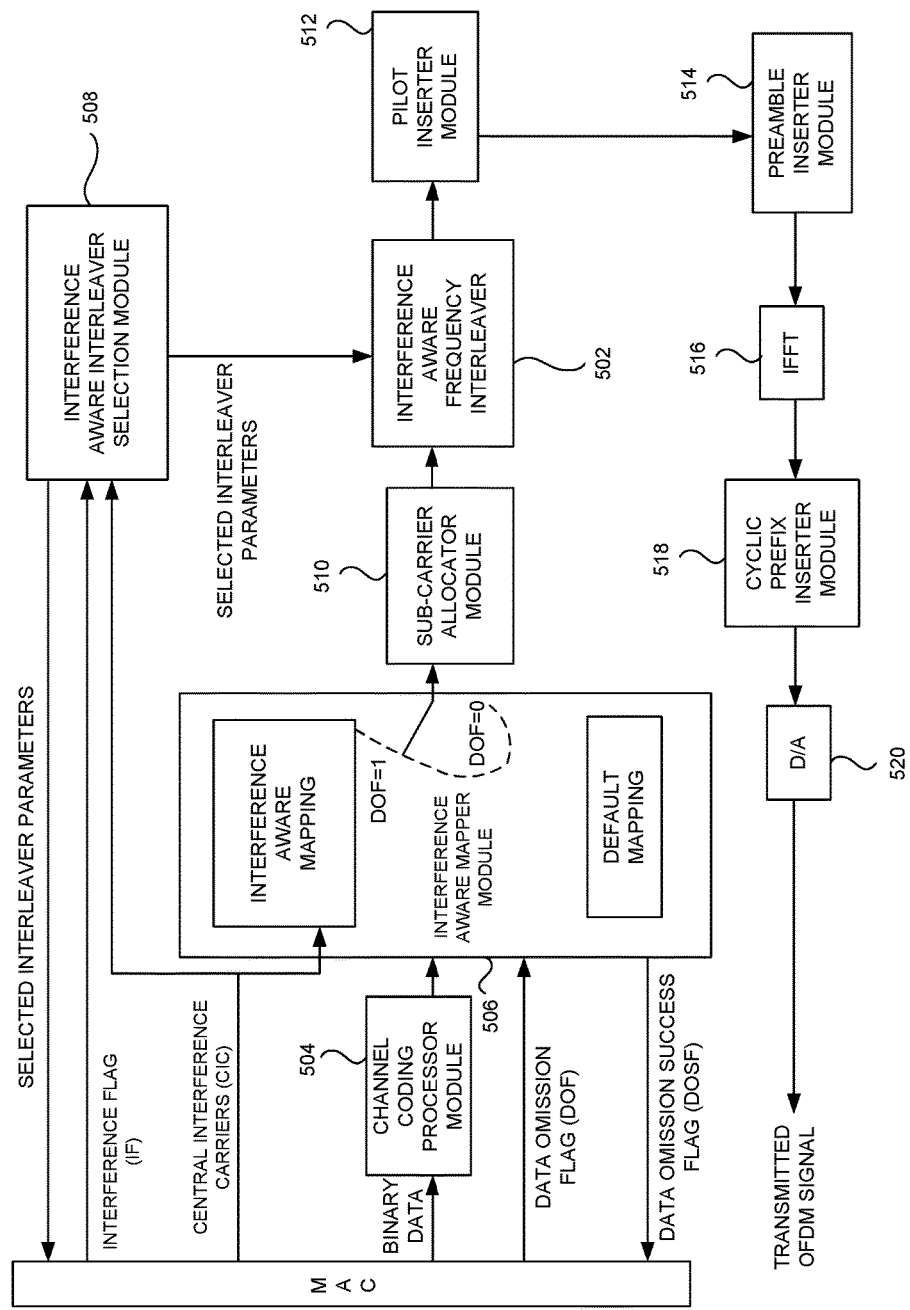
FIG. 5 illustrates a block diagram of baseband section for the baseband signal flow at a downlink transmitter (a base-station transmitter) with the co-channel interference rejection according to an embodiment herein.

FIG. 5 illustrates a block diagram of baseband section for the baseband signal flow at a downlink transmitter (a base-station transmitter) with the co-channel interference rejection according to an embodiment herein. The block diagram of the downlink transmitter includes an interference aware frequency interleaver 502. The block diagram of the downlink transmitter further includes a channel coding processor module 504, an interference aware mapper module 506, an interference aware interleaver selection module 508, a sub-carrier allocator module 510, a pilot inserter module 512, a preamble inserter module 514, an inverse fast fourier transform (IFFT) 516, a cyclic prefix inserter module 518 and a digital to analog (D/A) converter 520. The binary data (e.g. an input) is sent to the channel coding processor module 504 that includes a data scrambler, an encoder, a puncture and a bit-interleaver. The MAC layer along with the binary data transmits a data omission flag (DOF) that is generated due to presence of the co-channel interference at the CPE receiver. The central interference carriers from the MAC layer indicate the central sub-carrier's around which the co-channel interference is concentrated.

The interference aware frequency interleaver 502 spreads the co-channel interference affected carriers based on interference specific interleaving parameters and a frequency de-interleaving is performed corresponding to a frequency interleaving in the CPE receiver. The central interference carriers and an interference flag (IF) are used in the interference aware interleaver selection module 508 to select the frequency interleaving parameters from a lookup table. The selected frequency interleaving parameters are indicated to the MAC layer which in turn communicates to the corresponding CPE receiver to choose the appropriate parameter at the CPE receiver. In an embodiment, the data mapped, using the interference aware mapper module 506 after allocation of the sub-carriers is passed through the frequency aware interleaver parameterized using the interference aware interleaver selection module 508. The data is then transmitted from the interference aware frequency interleaver 502 through the pilot inserter module 512 and the preamble inserter module 514 for a frame and a super-frame to form appropriate OFDM symbol using the IFFT 516. The frame (i.e. a collection of the OFDM symbol) is passed into the cyclic prefix inserter module 518 and then sent to the D/A converter 520 followed by RF front end and eventually to an antenna. In an embodiment, the different interference flags (e.g. the interference flag and the data omission flag) and the interference parameters such as central interference carriers are generated based on the interference detection module 402 at the downlink receiver.

Figure 6:
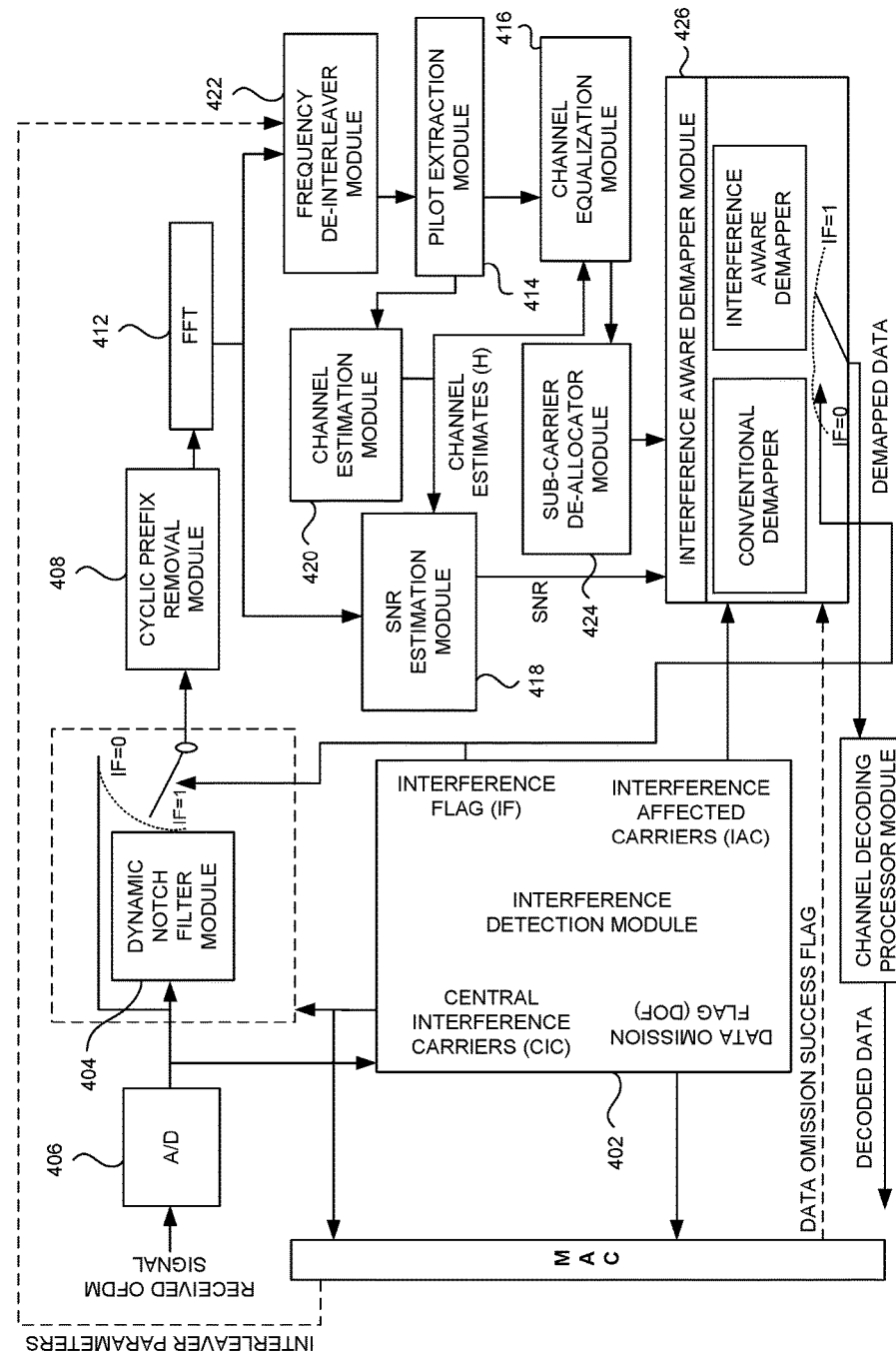
FIG. 6 illustrates a block diagram of baseband section for a baseband signal flow at an uplink receiver (a base-station receiver) with a co-channel interference rejection according to an embodiment herein.

FIG. 6 illustrates a block diagram of baseband section for a baseband signal flow at an uplink receiver (a base-station receiver) with a co-channel interference rejection according to an embodiment herein. The block diagram of the uplink receiver includes the interference detection module 402 and the dynamic notch filter module 404. The block diagram of the uplink receiver further includes the analog to digital (A/D) converter 406, the cyclic prefix removal module 408, the fast fourier transform (FFT) 412, the pilot extraction module 414, the channel equalization module 416, the signal to noise ratio (SNR) estimation module 418, the channel estimation module 420, the frequency de-interleaver module 422, the subcarrier de-allocator module 424, the interference aware de-mapper module 426 and the channel decoding processor module 428. The interference detection module 402 detects the presence of co-channel interference (CCI) in carriers of the orthogonal frequency division multiplexing (OFDM) signal and determines the co-channel interference affected carriers by identifying the central interference carriers corresponding to the co-channel interference affected carriers. In an embodiment, the co-channel interference is represented in the carriers using at least one of (i) the position, (ii) the spread or (iii) the interference power, of the co-channel interference affected carriers. The dynamic notch filter module 404 receives the central interference carriers from the interference detection module 402. The dynamic notch filter module 404 further mitigates the co-channel interference of the co-channel interference affected carriers without affecting a frame detection capability of a system by suppressing the interference power of the co-channel interference affected carriers. Information about the central interference carriers is transmitted to the CPE for selecting appropriate frequency interleaving parameters at the CPE transmitter.

In an embodiment, a signal path with the co-channel interference is passing through the dynamic notch filter module 404 and the dynamic notch filter is designed dynamically based on the information about the central interference carriers from (a) the interference detection module 402, (b) the cyclic prefix removal module 408, (c) the FFT 412, (d) the frequency de-interleaver module 422, (e) the pilot extraction module 414, (f) the channel estimation module 420, (g) the channel equalization module 416 where multipath effect from the data is removed, (h) the sub-carrier de-allocator module 424 and (i) the interference aware de-mapper module 426. The frequency de-interleaver module 422 includes the frequency interleaving parameters that are transmitted from the CPE transmitter based on the co-channel interference. In an embodiment, the interference aware de-mapper module 426 uses separate SNR estimations at the co-channel interference affected carriers and uses a multi-threshold softening/scaling on a conventional de-mapper results. Finally, the channel decoding processor module 428 includes a bit de-interleaving, de-puncturing, Viterbi decoder, and de-scrambling for decoding the data.

Figure 7:
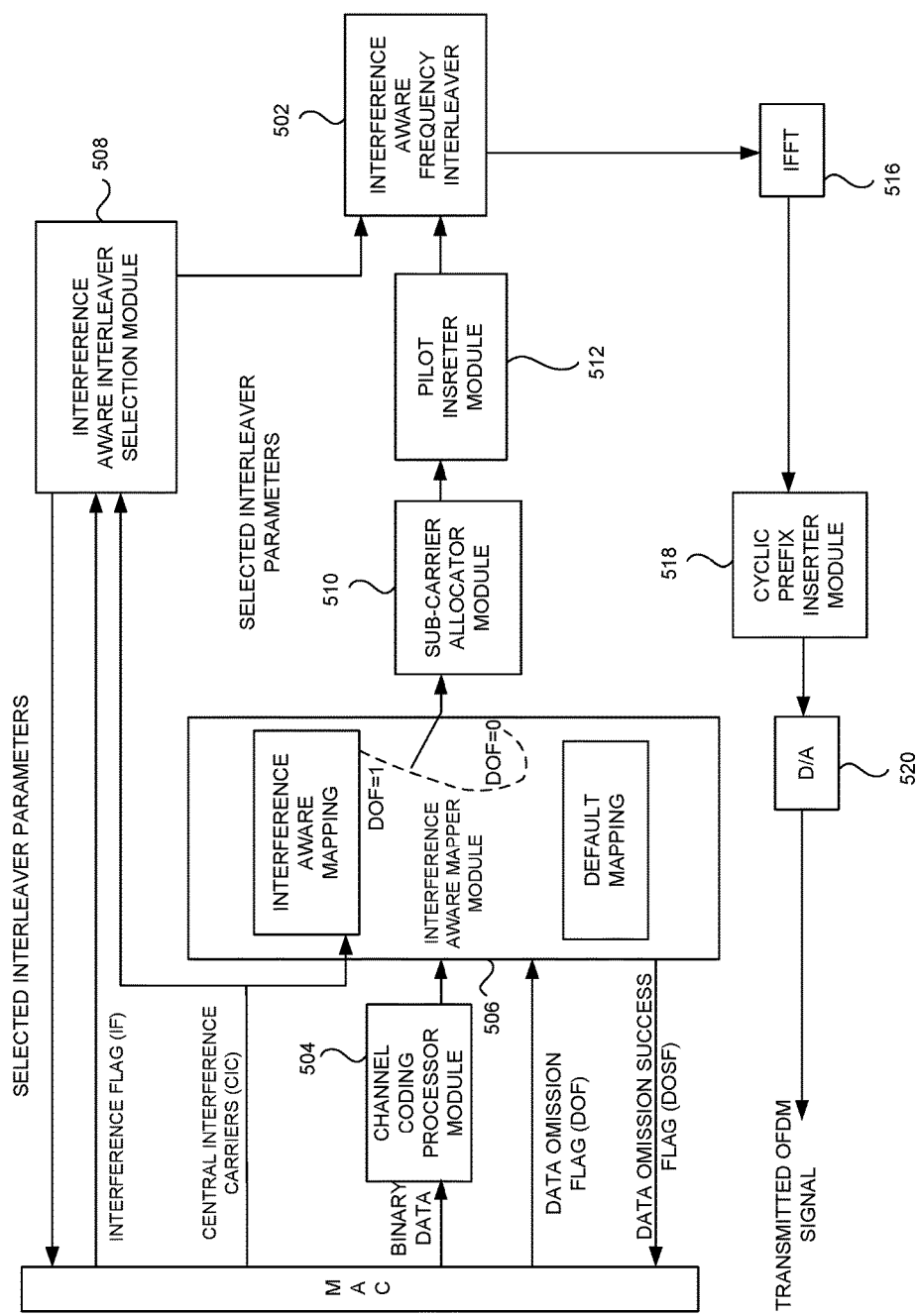
FIG. 7 illustrates a block diagram of baseband section for the baseband signal flow at an uplink transmitter (a CPE transmitter) with the co-channel interference rejection according to an embodiment herein.

FIG. 7 illustrates a block diagram of baseband section for the baseband signal flow at an uplink transmitter (the CPE transmitter) with the co-channel interference rejection according to an embodiment herein. The block diagram of the uplink transmitter includes the interference aware frequency interleaver 502. The block diagram of the uplink transmitter further includes the channel coding processor module 504, the interference aware mapper module 506, the interference aware interleaver selection module 508, the sub-carrier allocator module 510, the pilot inserter module 512, the inverse fast fourier transform (IFFT) 516, the cyclic prefix inserter module 518 and the digital to analog (D/A) converter 520. The MAC layer along with the binary data transmits a data omission flag (DOF) that is generated due to presence of the co-channel interference at the base-station receiver. The interference aware frequency interleaver 502 spreads the co-channel interference affected carriers based on interference specific interleaving parameters and the frequency de-interleaving is performed corresponding to the frequency interleaving in the base-station receiver. The central interference carriers and the interference flag (IF) are used in the interference aware interleaver selection module 508 to select the frequency interleaving parameters from the lookup table. The selected frequency interleaving parameters are indicated to the MAC layer which in turn communicates to the corresponding base-station receiver to choose the appropriate parameter. In an embodiment, the data mapped, using the interference aware mapper module 506 after allocation of the sub-carriers is passed through the pilot insertion module 512 and then to frequency aware interleaver parameterized using the interference aware interleaver selection module 508. The data is transmitted from the interference aware frequency interleaver 502 to the IFFT module 516 to form the OFDM symbol. The symbol is passed into the cyclic prefix inserter module 518 and then sent to radio frequency (RF) front end modules through the D/A converter 520 and eventually to an antenna. In an embodiment, the different interference flags (e.g. the interference flag and the data omission flag) and the interference parameters such as central interference carriers are generated based on the interference detection module 402 at the uplink receiver.

Figure 8:
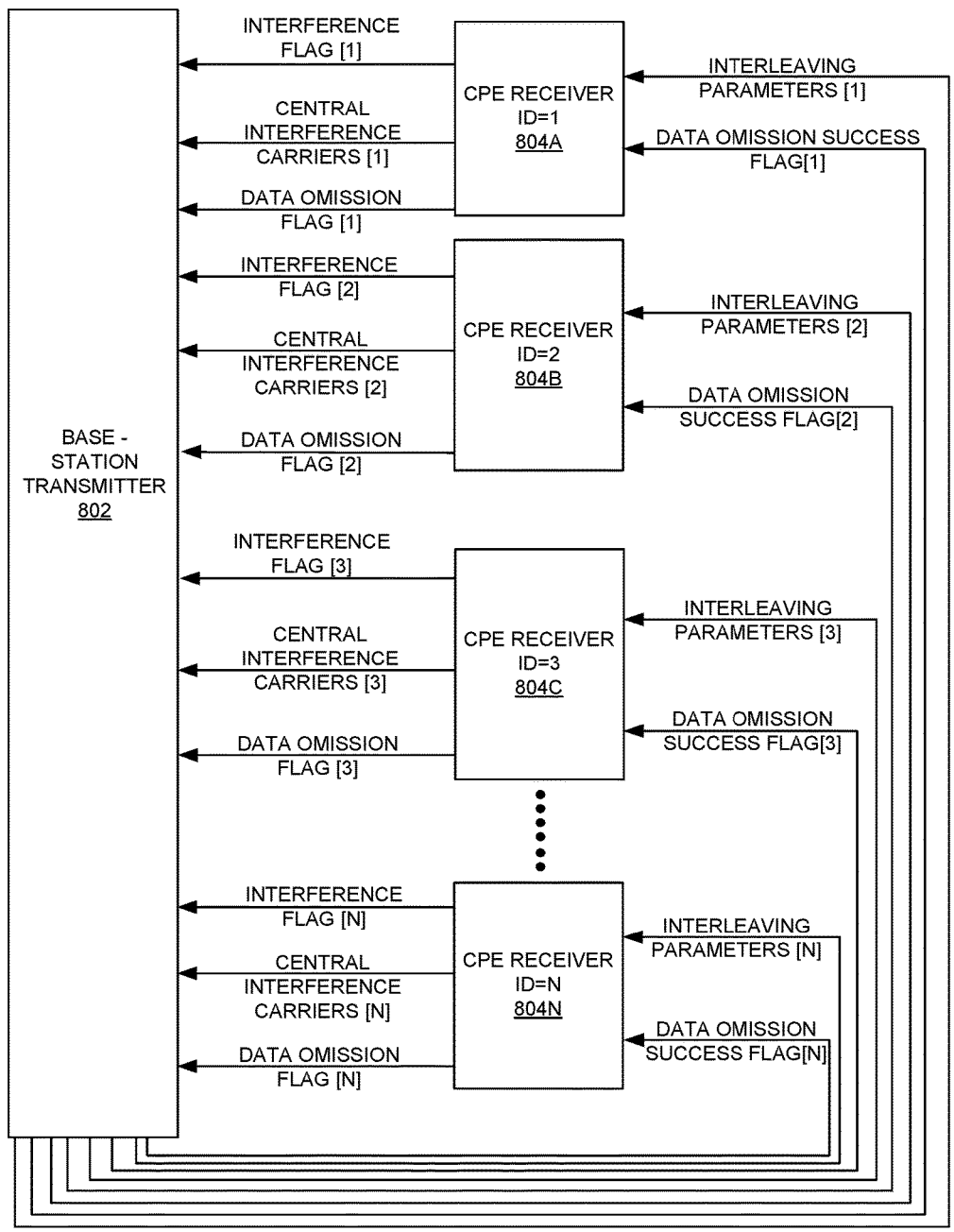
FIG. 8 is a diagram representing exchange of co-channel interference mitigation parameters between a base-station and a CPE for a point to multi-point scenario in a downlink system according to an embodiment herein.

FIG. 8 is a diagram representing exchange of the co-channel interference mitigation parameters between a base-station and a CPE for a point to multi-point scenario in a downlink system according to an embodiment herein. The downlink system includes a base-station 802 and one or more CPE 804A-N. The base-station 802 communicates with the one or more CPE 804A-N. In the point to multi-point scenarios, the co-channel interference may not affect the data of the one or more CPE 804A-N. Hence, the downlink system needs to identify which CPE is affected in order to change the frequency interleaving parameters related to the affected CPE. In an embodiment, the co-channel interference is detected at the one or more CPE 804A-N. The co-channel interference may not present at the one or more CPE 804A-N and the different CPE receivers analyze different interfering profile as the one or more CPE 804A-N are situated at different independent locations. Thus the one or more CPE 804A-N may need different set of frequency interleaving parameters. The one or more CPE 804A-N transmits the interference flag and the central interference carriers to the base-station 802. The base-station 802 runs the interference aware interleaver selection module 508 separately for each CPE receiver to select the appropriate interference specific interleaving parameters for each of the CPE. In an embodiment, the OFDM symbols (e.g. OFDM signals) include a generic control data (e.g. DS-MAP in IEEE 802.22) that are interleaved using default interleaving parameters as the generic control data is shared across the one or more CPE 804A-N. In another embodiment, the OFDM symbols specific to each of the CPE are interleaved with CPE specific set of frequency interleaving parameters. In an embodiment, the CPE does not share the signal data of the OFDM symbol for its data with the other CPE (e.g. any $n^{th}$ symbol of a frame may include the data specific to a particular $i^{th}$ CPE receiver only). In an embodiment, the base-station 802 communicates with each of the CPE independently. In another embodiment, the base-station 802 distinguishes each CPE data using CPE id's.

Figure 9:
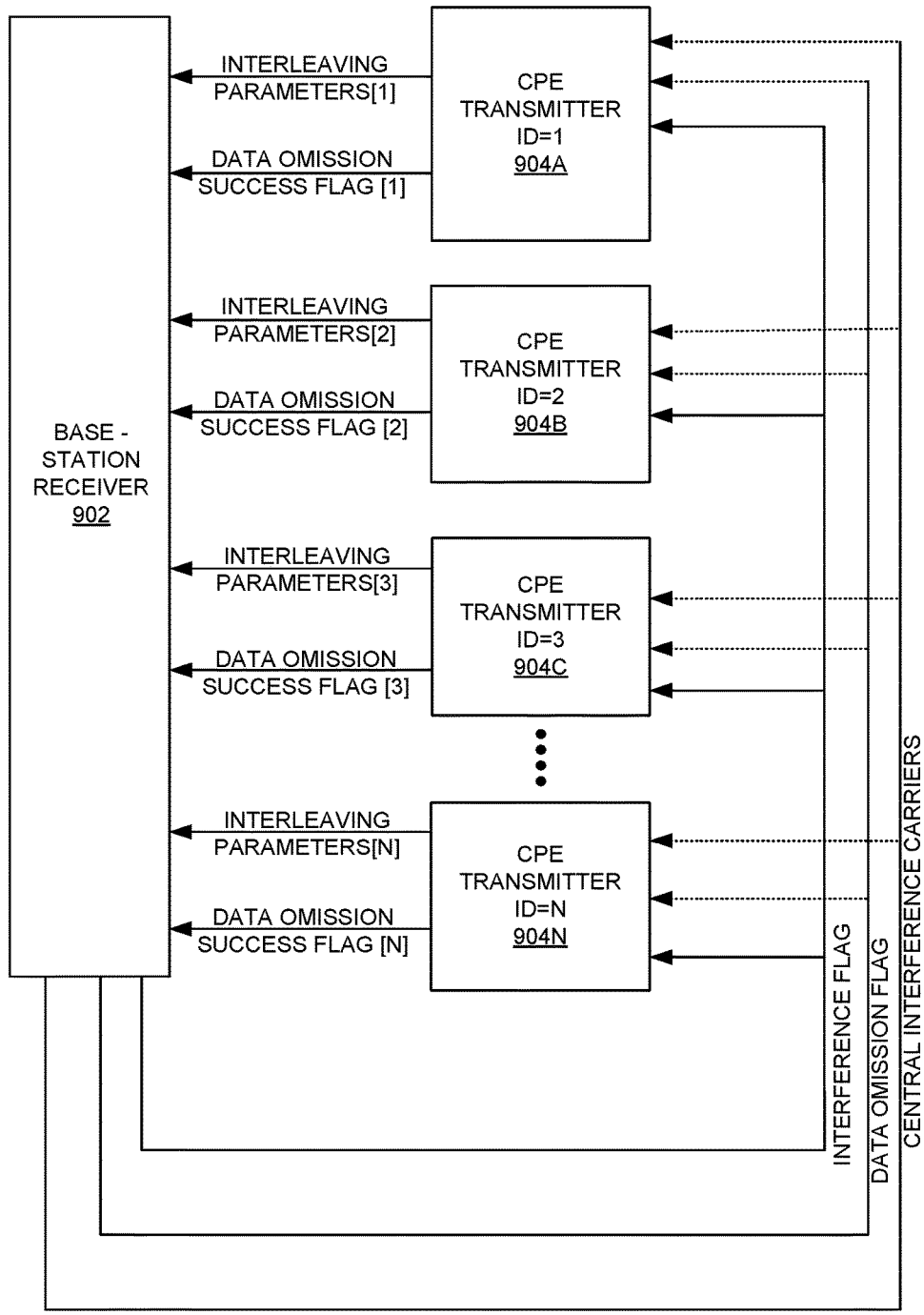
FIG. 9 is a diagram representing exchange of the co-channel interference mitigation parameters between a base-station and a CPE for a point to multi-point scenario in an uplink system according to an embodiment herein.

FIG. 9 is a diagram representing exchange of the co-channel interference mitigation parameters between a base-station and a CPE for a point to multi-point scenario in an uplink system according to an embodiment herein. The uplink system includes a base-station 902 and one or more CPE 904A-N. In the uplink system, the co-channel interference is detected at the base-station 902 and the base-station 902 receives data from the one or more CPE 904A-N. In an embodiment, the co-channel interference detected at the base-station 902 affects the data of the one or more CPE 904A-N simultaneously. The base-station 902 transmits an interference flag and the central interference carriers to the one or more CPE 904A-N. The base-station 902 further receives interference specific interleaving parameters from the one or more CPE 904A-N. The one or more CPE 904A-N may utilize the same central interference carriers for selecting the interference specific interleaving parameters. The interference corresponding to the one or more CPE 904A-N are same so that the one or more CPE 904A-N utilize the same central interference carriers for selecting the interference specific interleaving parameters. The base-station 902 may communicate with each of the CPE independently.

Figure 10:
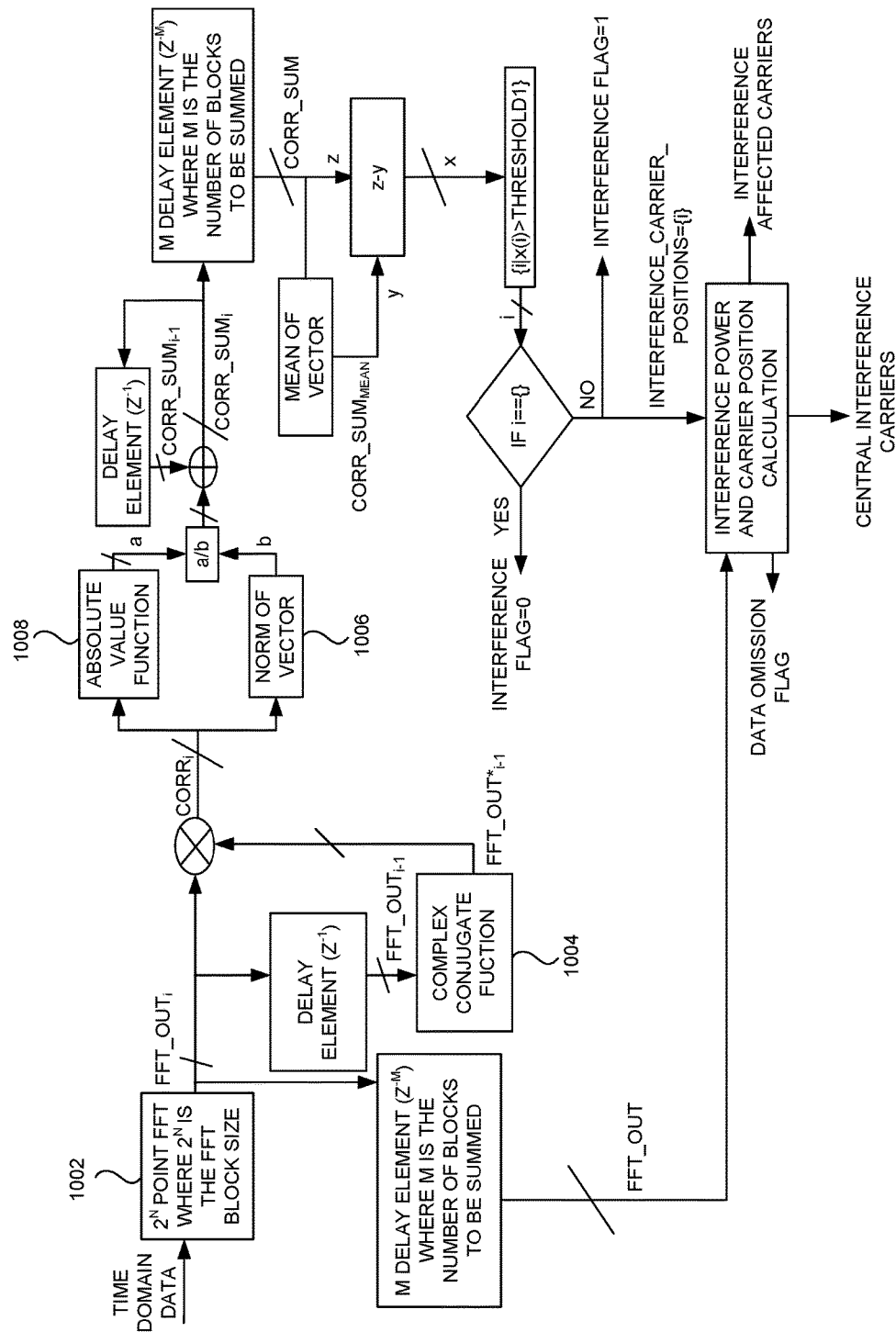
FIG. 10 illustrates a block diagram of an interference detection module of FIG. 4 and FIG. 6 according to an embodiment herein.

FIG. 10 illustrates a block diagram of the interference detection module 402 of FIG. 4 and FIG. 6 according to an embodiment herein. Initially, the interference detection module 402 obtains $2^N$ Fast Fourier Transform ($2^N$ FFT) samples where $2^N$ corresponds to FFT block length in interference detection module 402. The $2^N$ FFT samples at the output of a $2^N$ point FFT block 1002 are multiplied with a complex conjugate of previous FFT output samples from complex conjugate function block 1004 thus performing correlation across outputs of FFT blocks. In an embodiment, the correlated output samples are normalized by dividing the absolute values of $2^N$ correlated samples from absolute value function block 1008 by the norm of the correlated samples from norm of vector block 1006. This vector is accumulated and summed across M blocks of FFT output samples where M can be any positive integer greater than 0 using a first equation and the first equation is $$\text{Corr\_sum} = \sum_{i=1}^{M} \frac{\text{abs}(\text{FFT\_out}_i(1:2^N) \cdot \text{FFT\_out}_{i-1}^*(1:2^N))}{|\text{FFT\_out}_i(1:2^N) \cdot \text{FFT\_out}_{i-1}^*(1:2^N)|},$$

where $\text{FFT\_out}_i$ is a slot i of FFToutput, $\text{FFT\_out}_0 = \text{FFT\_out}_1$, abs(x) provides an absolute value of each element of x and |x| provides a norm of vector x. In an embodiment, the Corr_sum includes peaks at the carrier positions of the co-channel interference. In an embodiment, the position of the co-channel interference in the carriers is obtained using a second equation:

interference_carrier_positions=$\{i \in (1:2^N) | (\text{Corr\_sum}(i) - \text{mean}(\text{Corr\_sum})) > \text{threshold1}\}$.

In an embodiment, the co-channel interference is detected in the carriers when the interference_carrier positions is not a null set and the interference flag is set to 1. In another embodiment, the co-channel interference is not detected in the carriers when the position of the interference_carrier_positions is a null set and the interference flag is set to 0. The threshold1 is determined based on simulations in different channel conditions and is selected such that probability of false detection of the co-channel interference is minimal.

Figure 11:
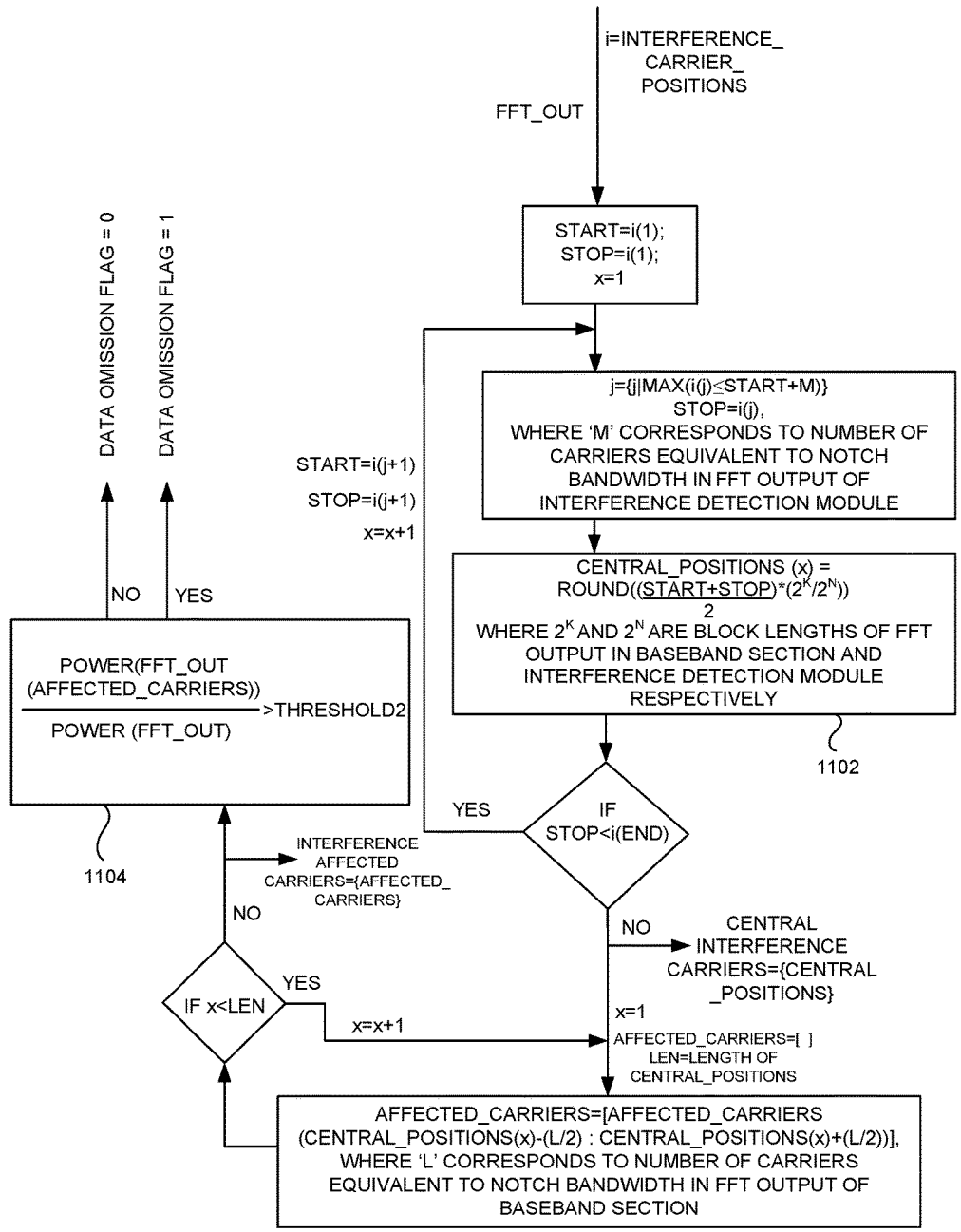
FIG. 11 illustrates a process flow for calculating interference power and a position of a co-channel interference in carriers of FIG. 10 according to an embodiment herein.

FIG. 11 illustrates a process flow for calculating an interference power and the position of the co-channel interference in the carriers of FIG. 10 according to an embodiment herein. Initially, the positions of the carriers which can be accommodated within a length corresponding to bandwidth of a notch in FFT output of the interference detection module 402 are grouped together and a central position of the carriers is corresponding to the central interference carriers. In an embodiment, the FFT block lengths in the interference detection module 402 (i.e. $2^N$) and other baseband modules (i.e. $2^K$) may be different. Hence central interference carriers corresponding to the $2^K$ point FFT block of baseband modules are obtained by multiplying a factor of $(2^K/2^N)$ to the central interference carriers corresponding to the $2^N$ point FFT block 1002 of the interference detection module 402 at step 1102. In an embodiment, the bandwidth of the notch is pre-decided based on simulations to provide proper attenuation in worst case interference scenario which may be supported using the system. In another embodiment, the bandwidth is also decided based on the interference power.

The positions of the central interference carrier correspond to central sub-carriers around which interference is concentrated and hence referred to as the central interference carriers. For example, analog TV standards include a vision carrier, an audio carrier and a colour carrier with different spacing depending on interfering standards. In most scenarios, a colour carrier power is ignored when the colour carrier power is significantly lower when compared to the vision and the audio carriers. From the central interference carriers, all the possible carrier positions which are attenuated by the notch filter in the FFT output of baseband sections are calculated and are referred as the interference affected carriers.

A ratio of the interference power to signal power (I/C) is calculated and compared with a threshold value (i.e. thresh-old2) using the interference affected carriers at step 1104. In an embodiment, a lowest modulation is not supported without errors when the ratio of interference power to signal power is greater than the threshold2 value and thus the data omission flag is set to 1. This leads to data not allocated to the interference affected carriers from next transmission onwards. In another embodiment, the threshold2 value is selected from simulations and is different for different narrow multiband interference profiles. The interference detection module 402 may be same at the base-station and CPE. The process is repeated periodically at a time interval to maintain track of interference signal. In an embodiment, the time interval is varied from location to location based on severity of the co-channel interference in the location.

Figure 12:
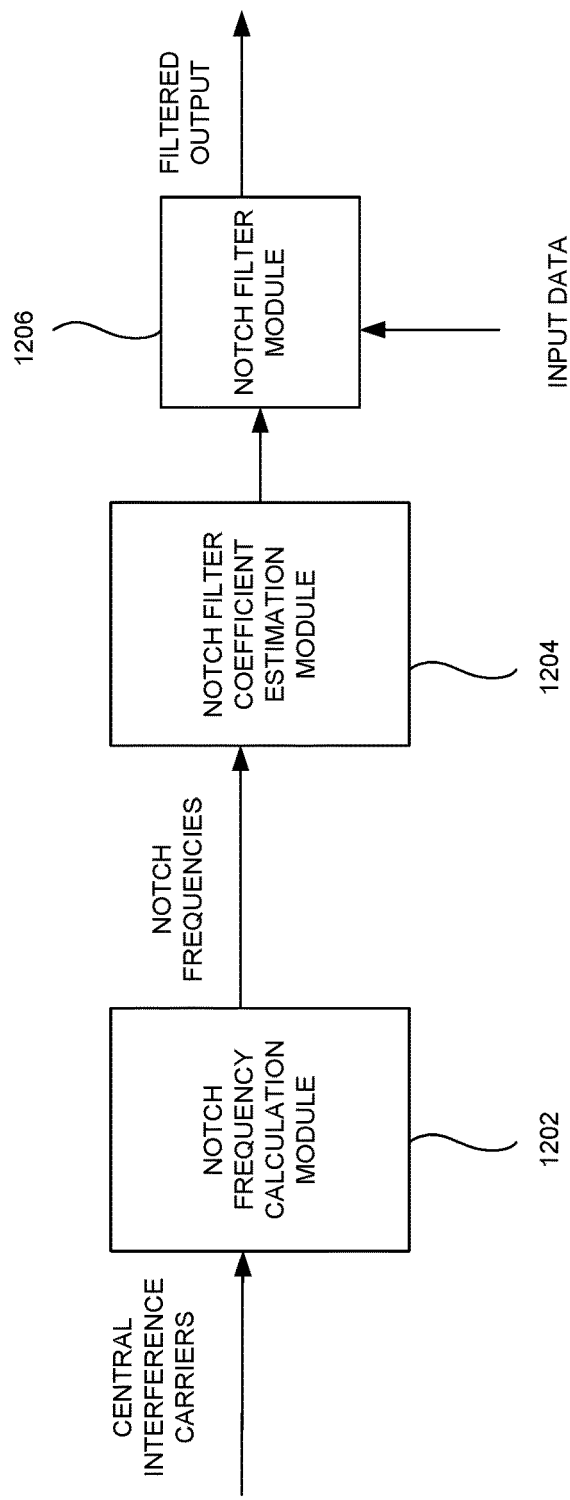
FIG. 12 illustrates a block diagram of a dynamic notch filter module of FIG. 4 and FIG. 6 according to an embodiment herein.

FIG. 12 illustrates a block diagram of the dynamic notch filter module 404 of FIG. 4 and FIG. 6 according to an embodiment herein. The dynamic notch filter module 404 receives the central interference carriers from the interference detection module 402. The dynamic notch filter module 404 further mitigates the co-channel interference of the co-channel interference affected carriers without affecting frame detection capability of the system by suppressing the interference power of the co-channel interference affected carriers. The dynamic notch filter module 404 includes a notch frequency calculation module 1202, a notch filter coefficient estimation module 1204 and a notch filter 1206. The notch frequency calculation module 1202 converts the position of the co-channel interference affected carriers into baseband frequency values to calculate notch frequencies. The notch filter coefficient estimation module 1204 calculates notch filter co-efficient based on the notch frequencies. The notch filter 1206 filters the co-channel interference of the co-channel interference affected carriers from an output of an analog to digital (A/D) converter 406 based on the notch filter co-efficient. In an embodiment, the co-channel interference in the OFDM signal is suppressed to provide entire dynamic range of Fast Fourier Transform (FFT) to be available for the OFDM signal when (a) narrow band interference is present in time domain input and (b) the interference power is higher. The presence of high power narrowband interference leads to the desired signal to be saturated to low values. In an embodiment, entire range of FFT is available for the desired signal by removing the high interference power using a time domain notch filter before the FFT processing. In an embodiment, the dynamic notch filter module 404 is same at the base-station receiver and the CPE receiver. The dynamic notch filter module 404 may include an infinite impulse response (IIR) dynamic notch filter module.

Figure 13:
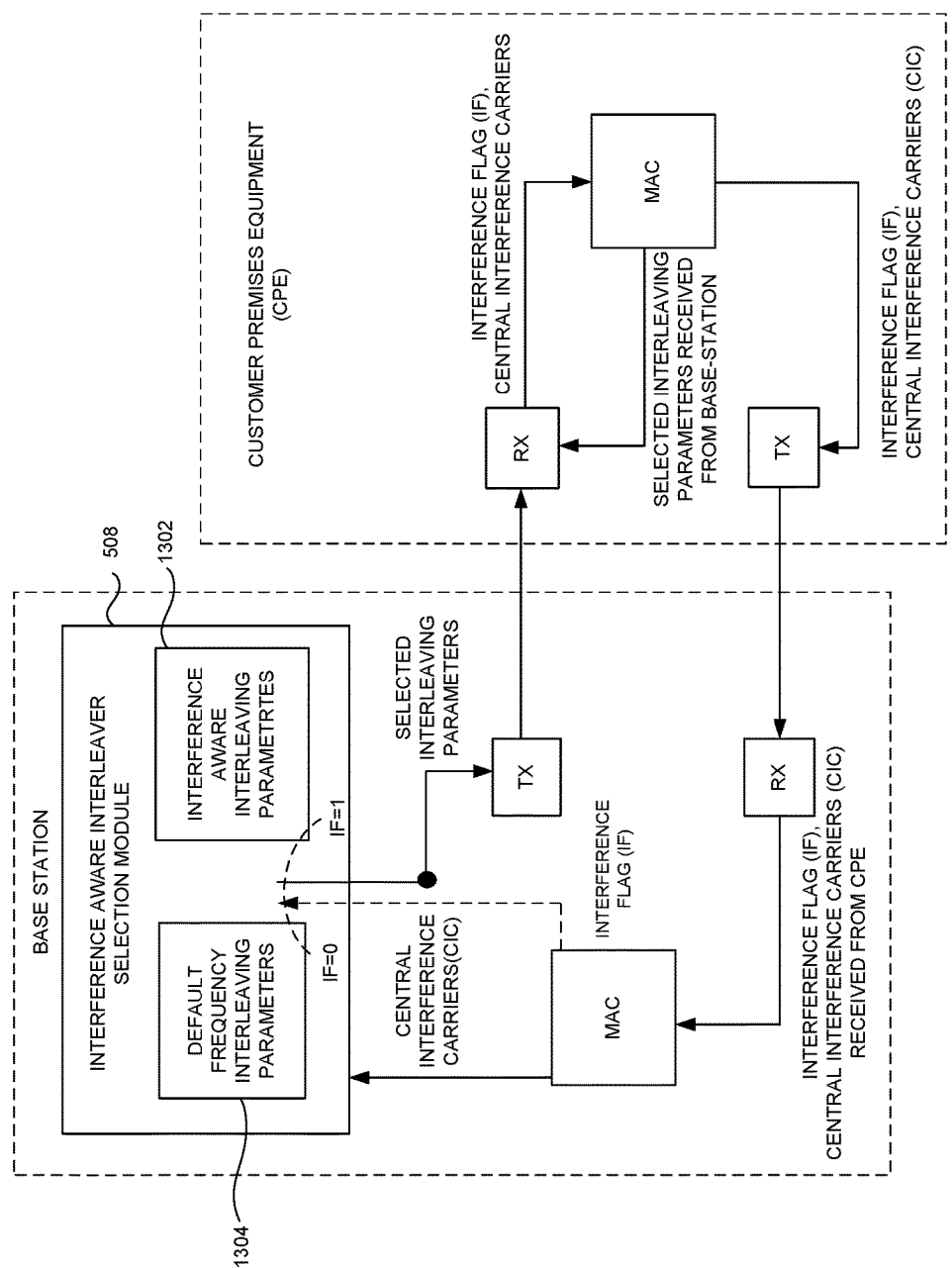
FIG. 13 illustrates a block diagram of a interference aware frequency interleaver for a downlink of FIG. 5 according to an embodiment herein.

FIG. 13 illustrates a block diagram of the interference aware frequency interleaver 502 for a downlink of FIG. 5 according to an embodiment herein. The interference aware frequency interleaver 502 pre-determines the interference specific interleaving parameters that control the spread of the frequency interleaving. In an embodiment, the interference specific interleaving parameters are stored in a lookup table. The interference aware frequency interleaver 502 includes the interference aware interleaver selection module 508 that determines an interference profile based on central interfering carrier indices of the narrow multiband signal to select an appropriate interference specific interleaving parameters based on the lookup table. The interference aware interleaver selection module 508 further selects the appropriate interference aware interleaving parameters (e.g. interference specific interleaving parameters) 1302 from the lookup table using the central interference carriers based on (a) the position of the co-channel interference affected carriers and (b) the interference profiles. In an embodiment, the selected interference specific interleaving parameters 1302 are added into the WS modems when an interference flag (IF) associated with the OFDM signal is high. In another embodiment, default frequency interleaving parameters 1304 are added into the WS modems when the interference flag (IF) associated with the OFDM signal is low.

In an embodiment, the WS modem utilizes a turbo-like interleaving (TLI) algorithm for the frequency interleaving to generate a permutation rule L(x) using interference aware interleaving parameters. The interference aware interleaving parameters include (a) interleaving block size K, (b) integers p and q and (c) number of iterative calculations j in the TLI algorithm. In an embodiment, an output sequence is generated at each step of iteration. A value of the permutation rule L(x) in an input sequence corresponds to x in the output sequence. An index pattern is calculated at an output of iteration m using an equation:

$$I_{p,q,K}^{(m)}(x) = [K-p+x+q \cdot p \cdot [-x-p \cdot I_{p,q,K}^{(m-1)}(x)] \bmod K] \bmod K,$$

The index pattern may be utilized as the permutation rule after j iterations using an equation: $L(x)=I_{p,q,K}^{(j)}(x)$. In an embodiment, performance of the TLI algorithm is characterized by an interleaving spread depth $\Delta L(\Delta x)$ which is calculated for indices x and x+$\Delta x$ in the output sequence using an equation:

$$\Delta L(\Delta x) = \min_{0 < x < K-1} |L(x + \Delta x) - L(x)|.$$

In an embodiment, the default frequency interleaving parameters (e.g. p, q and j) 1304 are set to increase the interleaving spread depth $\Delta L(\Delta x)$ for small values of $\Delta x$. The increased interleaving spread depth of the interference affected carriers ensure that minimum interleaving spread depth across the entire OFDM signal is adequate sufficient for good performance when the co-channel interference is detected. In an embodiment, the i and q are natural numbers selected with appropriate bounds. In another embodiment, the integer p can be any factor of K.

Figure 14:
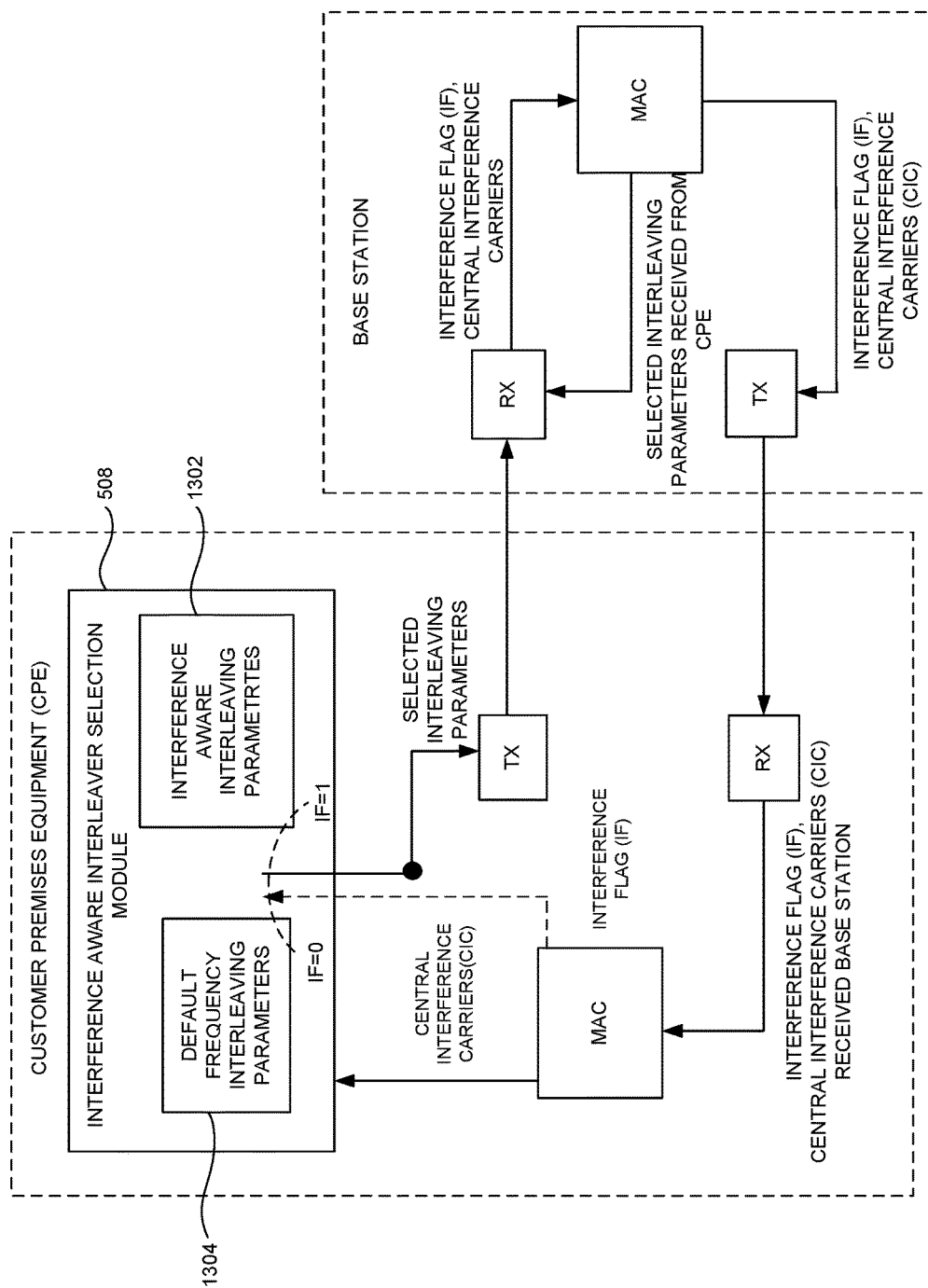
FIG. 14 illustrates a block diagram of a interference aware frequency interleaver for an uplink of FIG. 7 according to an embodiment herein.

FIG. 14 illustrates a block diagram of the interference aware frequency interleaver for an uplink of FIG. 7 according to an embodiment herein. The functions of the elements shown in FIG. 14 as have been described in FIG. 13.

Figure 15:
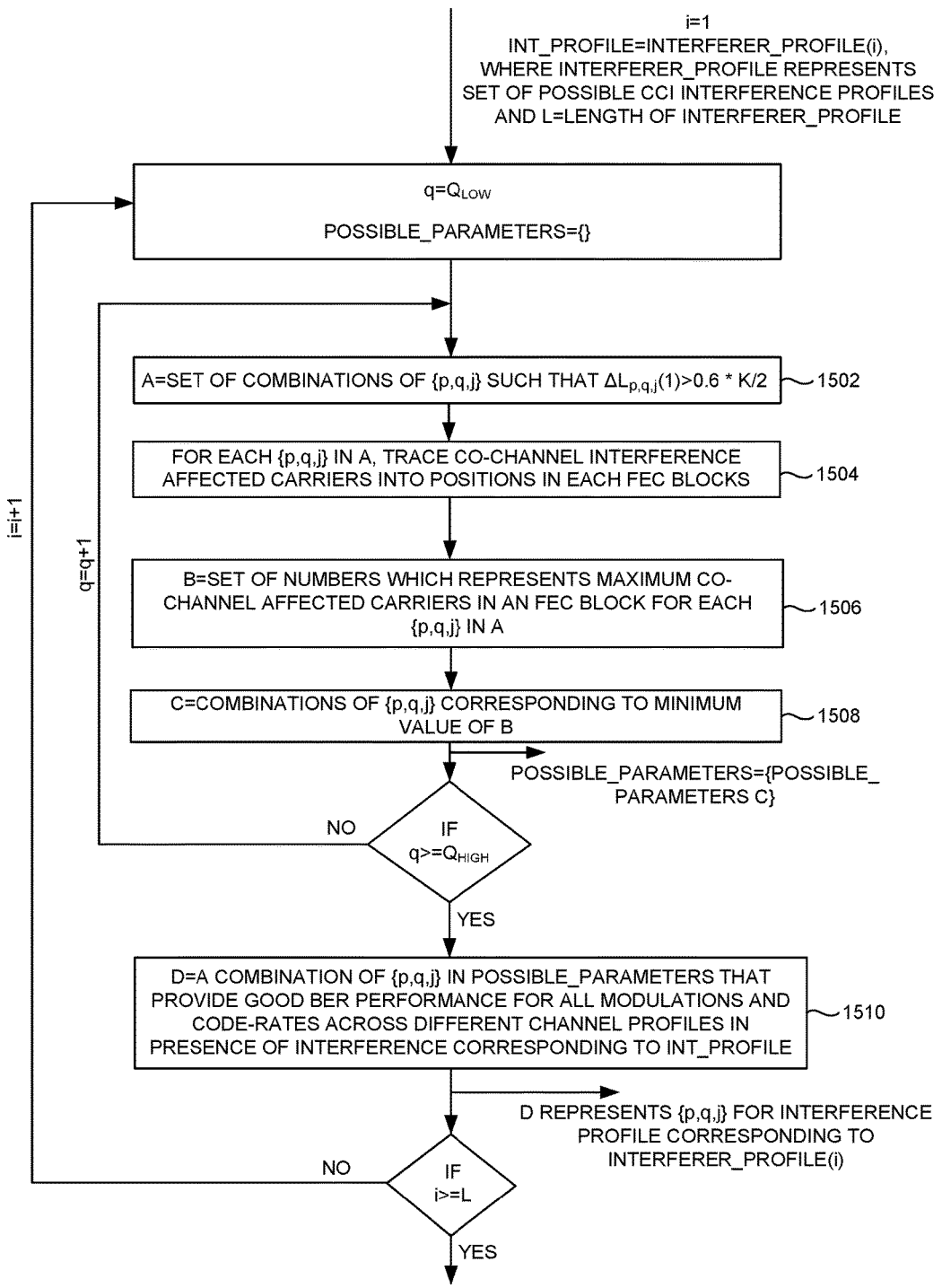
FIG. 15 illustrates a process flow diagram of determining frequency interleaving parameters according to an embodiment herein.

FIG. 15 illustrates a process flow diagram of determining frequency interleaving parameters according to an embodiment herein. The frequency interleaving parameters are generated based on pre-determination of the interference specific interleaving parameters by following steps of: (a) setting a value for the q in the interval [$Q_{low}$, $Q_{high}$], where $Q_{low}$ and $Q_{high}$ are natural numbers representing lower bound and upper bound respectively, which determines combinations of values for the integer p and number of the iterative calculations j for which the interleaving spread depth $\Delta L(\Delta x)$ is greater than 60% of maximum possible interleaving spread depth (K/2) at step 1502, (b) tracing the position of the co-channel interference affected carriers into each forward error correction (FEC) block to determine number of data positions of the co-channel interference affected carriers in each of the FEC block at step 1504, (c) determining maximum number of the co-channel interference affected carriers present in the FEC block at step 1506, (d) selecting the appropriate interference specific interleaving parameters which minimize the maximum number of the co-channel interference affected carriers present in the FEC block to spread interference affected data across all FEC modules to recover an error prone data at step 1508, (e) repeating the steps (a) to (d) for each value of the q in [$Q_{low}$, $Q_{high}$], (f) running simulations with the interference specific interleaving parameters for different channel conditions and determining the interference specific interleaving parameters that provide best performance for all modulations and code-rates for at least one interference profile at step 1510 and (g) repeating the steps (a) to (f) for different possible interference profiles. In an embodiment, the combination of the interference specific interleaving parameters spread the co-channel interference affected carriers effectively across a spectrum of the narrow multiband signal. The lookup table is generated to store the best performing of the one or more interference specific interleaving parameters for each interference profile after determining the interference specific interleaving parameters.

Figure 16:
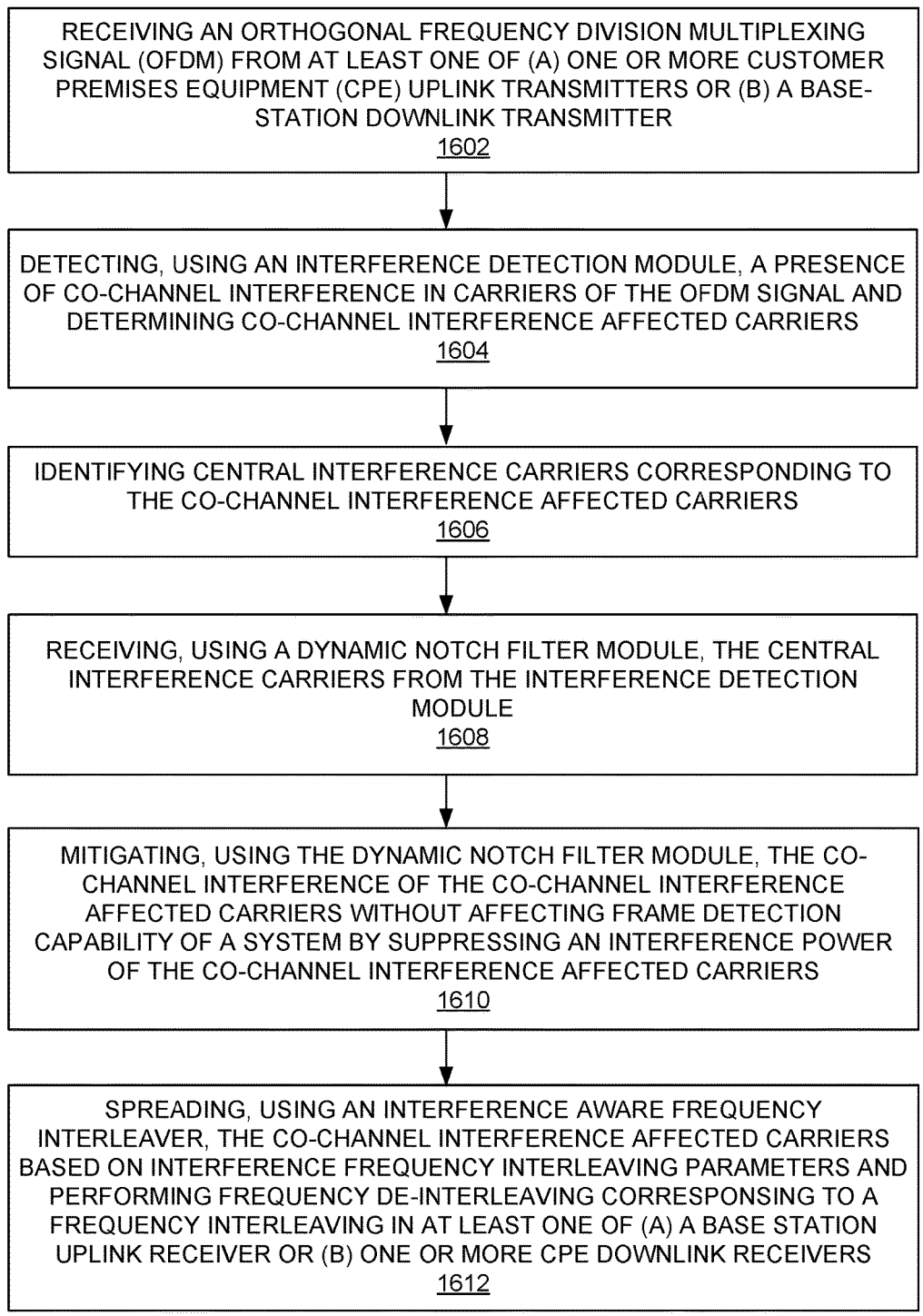
FIG. 16 is a flow diagram that illustrates a method for mitigating co-channel interference caused due to narrow multiband signal in white space modems for an uplink or a downlink according to an embodiment herein.

FIG. 16 is a flow diagram that illustrates a method for mitigating co-channel interference caused due to narrow multiband signal in white space modems for an uplink or a downlink according to an embodiment herein. At step 1602, an orthogonal frequency division multiplexing signal (OFDM) is received from at least one of (a) one or more customer premises equipment (CPE) uplink transmitters or (b) a base-station downlink transmitter. At step 1604, a presence of the co-channel interference (CCI) in carriers of the OFDM signal is detected and co-channel interference affected carriers are determined using an interference detection module 402. At step 1606, central interference carriers corresponding to the co-channel interference affected carriers are identified. The co-channel interference is represented in the carriers using at least one of (i) a position, (ii) a spread or (iii) an interference power, of the co-channel interference affected carriers. At step 1608, the central interference carriers from the interference detection module are received using a dynamic notch filter module 404. At step 1610, the co-channel interference of the co-channel interference affected carriers are mitigated without affecting frame detection capability of a system. In an embodiment, mitigating comprises suppressing the interference power of the co-channel interference affected carriers. At step 1612, the co-channel interference affected carriers are spread based on interference specific interleaving parameters and frequency de-interleaving are performed corresponding to a frequency interleaving in at least one of (a) a base-station uplink receiver or (b) one or more CPE downlink receivers using an interference aware frequency interleaver.

Figure 17:
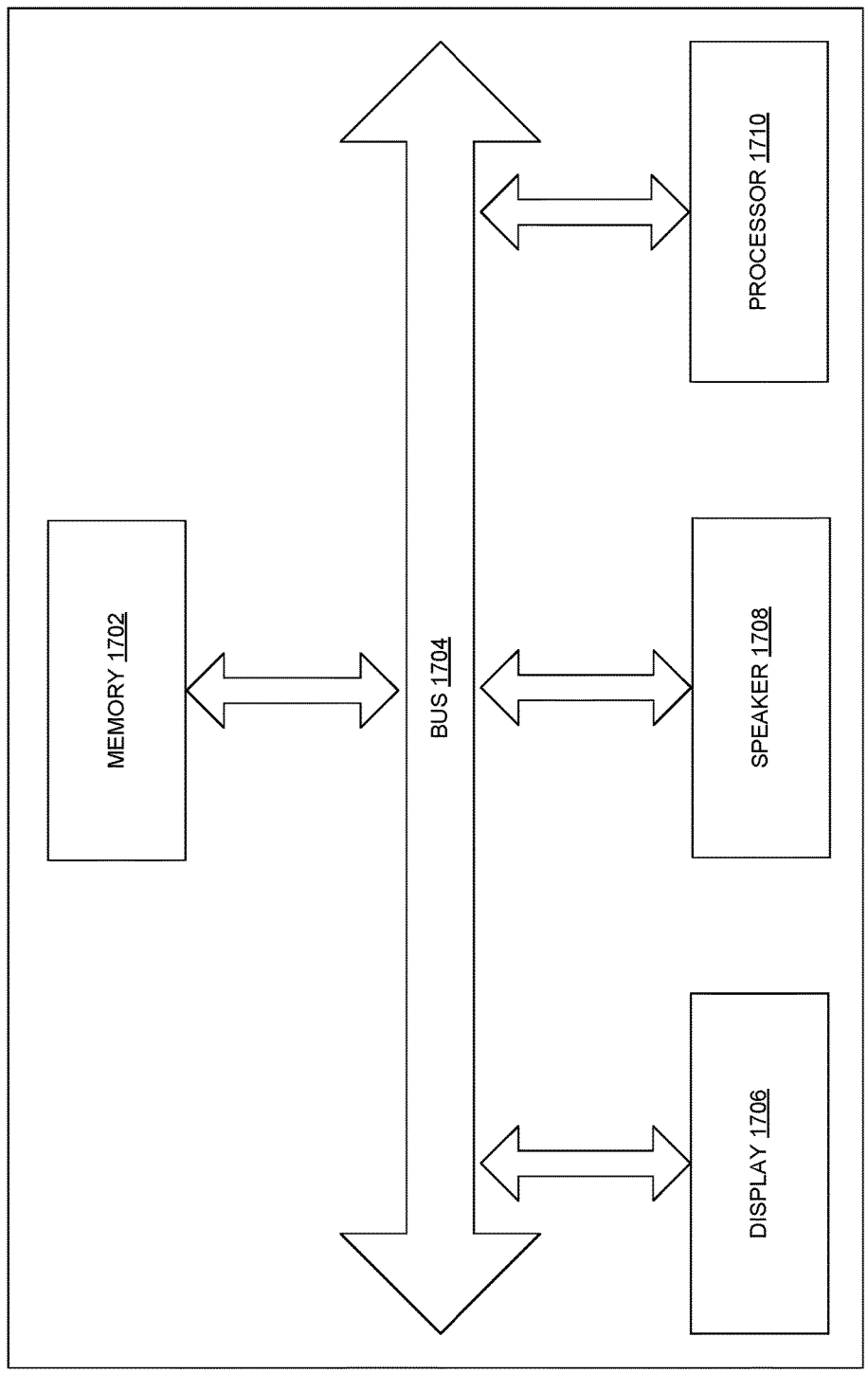
FIG. 17 illustrates an exploded view of a receiver of FIG. 4 and FIG. 6 according to an embodiment herein.

FIG. 17 illustrates an exploded view of a receiver of FIG. 1 having a memory 1702 having a set of instructions, a bus 1704, a display 1706, a speaker 1708, and a processor 1710 capable of processing the set of instructions to perform any one or more of the methodologies herein, according to an embodiment herein. The processor 1710 may also enable digital content to be consumed in the form of video for output via one or more displays 1706 or audio for output via speaker and/or earphones 1708. The processor 1710 may also carry out the methods described herein and in accordance with the embodiments herein.

Digital content may also be stored in the memory 1702 for future processing or consumption. The memory 1702 may also store program specific information and/or service information (PSI/SI), including information about digital content (e.g., the detected information bits) available in the future or stored from the past. A user of the receiver may view this stored information on display 1706 and select an item of for viewing, listening, or other uses via input, which may take the form of keypad, scroll, or other input device(s) or combinations thereof. When digital content is selected, the processor 1710 may pass information. The content and PSI/SI may be passed among functions within the receiver using the bus 1704.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 18:
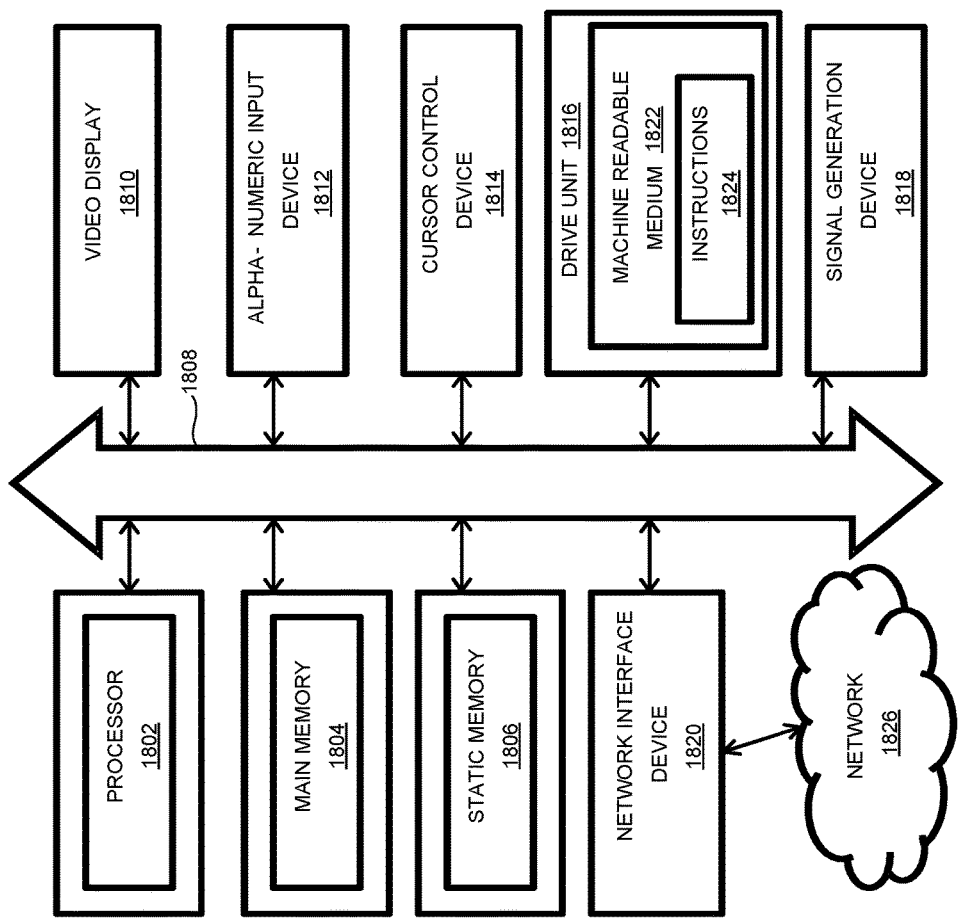
FIG. 18 illustrates a schematic diagram of computer architecture in accordance with the embodiments herein.

FIG. 18 depicts a functional block diagram of an example general-purpose digital computing environment that may be used to implement various aspects of the present technology disclosed herein (such as for example, a user device, a base-station, a CPE or a system). The general purpose digital computing environment of FIG. 18 includes a processor 1802, a main memory 1804, a static memory 1806, a bus 1808, a video display 1810, an alpha-numeric input device 1812, a cursor control device 1814, a drive unit 1816, a signal generation device 1818, a network interface device 1820, a machine readable medium 1822, instructions 1824 and a network 1826, according to one embodiment.

The processor 1802 may be include, but is not limited to a microprocessor, a state machine, an application specific integrated circuit, a field programmable gate array etc. (e.g., an Intel® Pentium® processor). The main memory 1804 may be a dynamic random-access memory and/or a primary memory of a computer system. The static memory 1806 may include for example a hard disk drive for reading from and writing to a hard disk (not shown), a magnetic disk drive for reading from or writing to a removable magnetic disk, or an optical disk drive for reading from or writing to a removable optical disk such as a CD ROM or other optical media. The drives and their associated computer-readable media provide nonvolatile storage of computer readable instructions, data structures, program modules and other data for a computer. It will be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the example general purpose computing environment.

The bus 1808 may be an interconnection between various circuits and/or structures of the purpose computing environment. The video display 1810 may provide a graphical representation of information on the data processing system. The alpha-numeric input device 1812 may be a keypad, a keyboard and/or any other input device of text (e.g., a special device to aid the physically handicapped), a microphone, joystick, game pad, satellite dish, scanner or the like. The alpha-numeric input device 1812 is often connected to the processing unit through a serial port interface that is coupled to the system bus, but may be connected by other interfaces, such as a parallel port, game port or a universal serial bus (USB).

The cursor control device 1814 may be a pointing device such as a mouse. The drive unit 1816 may be the hard drive, a storage system, and/or other longer-term storage subsystem. The signal generation device 1818 may be a bios and/or a functional operating system of the data processing system. The network interface device 1820 may be a device that performs interface functions such as code conversion, protocol conversion and/or buffering required for communication to and from the network 1826. The machine readable medium 1822 may provide instructions on which any of the methods disclosed herein may be performed. The instructions 1824 may provide source code and/or data code to the processor 1802 to enable any one or more operations disclosed herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for mitigating co-channel interference (CCI) caused due to narrow multiband signal in white space (WS) modems, comprising:
    a base-station that comprises:
        a base-station receiver that receives an orthogonal frequency division multiplexing signal (OFDM) from one or more customer premises equipment (CPE) transmitters, wherein said base-station receiver comprises:
            an interference detection module that detects a presence of said co-channel interference (CCI) in carriers of said OFDM signal and determines co-channel interference affected carriers by identifying central interference carriers corresponding to said co-channel interference affected carriers, wherein said co-channel interference is represented in said carriers using at least one of (i) a position, (ii) a spread or (iii) an interference power, of said co-channel interference affected carriers; and
            a dynamic notch filter module that (i) receives said central interference carriers from said interference detection module and (ii) mitigates said co-channel interference of said co-channel interference affected carriers without affecting frame detection capability by suppressing said interference power of said co-channel interference affected carriers;
        a base-station transmitter that comprises an interference aware frequency interleaver that spreads said co-channel interference affected carriers based on interference specific interleaving parameters and frequency de-interleaving is performed corresponding to a frequency interleaving in said base station receiver.

2. The system of claim 1, wherein said dynamic notch filter module
    converts said position of said co-channel interference affected carriers into baseband frequency values to calculate notch frequencies;
    calculates notch filter co-efficient based on said notch frequencies; and
    filters said co-channel interference of said co-channel interference affected carriers from an output of an analog to digital (A/D) converter based on said notch filter co-efficient.

3. The system of claim 1, wherein said interference aware frequency interleaver
    pre-determines said interference specific interleaving parameters that control said spread of said frequency interleaving; and
    stores said interference specific interleaving parameters in a lookup table,
    wherein said interference aware frequency interleaver comprises an interference aware interleaver selection module that determines an interference profile based on central interfering carrier indices of said narrow multiband signal to select an appropriate interference specific interleaving parameters based on said lookup table, wherein said interference aware interleaver selection module selects said appropriate interference specific interleaving parameters from said lookup table using said central interference carriers based on (a) said position of said co-channel interference affected carriers and (b) said interference profile,
    wherein said selected interference specific interleaving parameters are added into said WS modems when an interference flag associated with said OFDM signal is high.

4. The system of claim 3, wherein default frequency interleaving parameters are added into said WS modems when said interference flag associated with said OFDM signal is low.

5. The system of claim 1, wherein said co-channel interference in said OFDM signal is suppressed to provide entire dynamic range of fast fourier transform (FFT) to be available for said OFDM signal.

6. The system of claim 1, wherein said interference detection module detects said presence of said co-channel interference (CCI) in said carriers of said OFDM signal by performing the steps of:
    obtaining $2^N$ fast fourier transform (FFT) samples where $2^N$ represents FFT block size in said interference detection module;
    multiplying said $2^N$ FFT samples with a complex conjugate of a previous block of said $2^N$ fast fourier transform (FFT) samples;
    normalizing output samples by dividing absolute value of said $2^N$ FFT samples using a norm of a vector;
    accumulating and adding said vector across M blocks of said $2^N$ fast fourier transform (FFT) samples using a first equation $$\text{Corr\_sum} = \sum_{i=1}^{M} \frac{\text{abs}(\text{FFT\_out}_i(1:2^N) \cdot \text{FFT\_out}_{i-1}^*(1:2^N))}{|\text{FFT\_out}_i(1:2^N) \cdot \text{FFT\_out}_{i-1}^*(1:2^N)|},$$

wherein $\text{FFT\_out}_i$ is a slot i of FFT output, wherein said Corr_sum comprises peaks at carrier positions of said co-channel interference; and
    determining said position of said co-channel interference in said carriers using a second equation:

interference_carrier_positions=$\{i \in (1:2^N) | (\text{Corr\_sum}(i) - \text{mean}(\text{Corr\_sum})) > \text{threshold1}\}$.

7. The system of claim 6, wherein said co-channel interference is detected in said carriers when said interference_carrier_positions is not a null set and said interference flag is set to 1, wherein said threshold1 is determined based on simulations in different channel conditions and is selected such that probability of false detection of said co-channel interference is minimal.

8. The system of claim 1, wherein said WS modem utilizes a turbo-like interleaving (TLI) algorithm for said frequency interleaving to generate a permutation rule L(x) using parameters, wherein said parameters comprises (a) interleaving block size K, (b) integers p and q and (c) number of iterative calculations j in said TLI algorithm, wherein an output sequence is generated at each step of iteration, wherein a value of said permutation rule L(x) in an input sequence corresponds to x in said output sequence, wherein an index pattern is calculated at an output of iteration m using an equation $$I_{p,q,K}^{(m)}(x)=[K-p+x+q\cdot p\cdot[-x-p\cdot I_{p,q,K}^{(m-1)}(x)] \bmod K] \bmod K,$$

wherein said index pattern is utilized as said permutation rule after j iterations using an equation $L(x)=I_{p,q,K}^{(j)}(x)$, wherein a performance of said TLI algorithm is characterized by an interleaving spread depth $\Delta L(\Delta x)$ that is calculated for indices x and $x+\Delta x$ in said output sequence using an equation $$\Delta L(\Delta x) = \min_{0<x<K-1} |L(x+\Delta x) - L(x)|.$$

9. The system of claim 3, wherein said pre-determining said interference specific interleaving parameters comprises the steps of:
(a) setting a value for said integer q to determine combinations of values for said integer p and number of said iterative calculations j for which said interleaving spread depth $\Delta L(\Delta x)$ is greater than 60% of maximum possible interleaving spread depth;
(b) tracing said position of said co-channel interference affected carriers into each forward error correction (FEC) block to determine number of data positions of said co-channel interference affected carriers in each of said FEC block;
(c) determining maximum number of said co-channel interference affected carriers present in said FEC block;
(d) selecting said appropriate interference specific interleaving parameters which minimize said maximum number of said co-channel interference affected carriers present in said FEC block to spread interference affected data across all FEC modules to recover an error prone data;
(e) repeating said steps (a) to (d) for each value of said integer q, wherein said combination of said interference specific interleaving parameters spread said co-channel interference affected carriers effectively across a spectrum of said narrow multiband signal;
(f) running simulations with said interference specific interleaving parameters for different channel conditions and determining said interference specific interleaving parameters that provide best performance for all modulations and code-rates for at least one interference profile; and
(g) repeating said steps (a) to (f) for different possible interference profiles, wherein said lookup table is generated to store said best performing one or more interference specific interleaving parameters for each interference profile after determining said interference specific interleaving parameters.

10. The system of claim 1, wherein said co-channel interference is detected at said base-station that receives data from said one or more CPE, wherein said co-channel interference detected at said base-station affects said data of said one or more CPE simultaneously.

11. The system of claim 10, wherein said base-station transmits said interference flag and said central interference carriers to said one or more CPE; receives interference specific interleaving parameters from said one or more CPE, wherein said one or more CPE utilize said same central interference carriers for selecting said interference specific interleaving parameters, wherein said interference corresponding to said one or more CPE are same so said one or more CPE utilize said same central interference carriers for selecting said interference specific interleaving parameters.

12. The system of claim 1, wherein said dynamic notch filter module comprises an infinite impulse response (IIR) dynamic notch filter module.

13. The system of claim 1, wherein said system further detects and mitigates said co-channel interference of said narrow multiband signal in at least one of (i) frequency division duplex modems or (ii) time division duplex modems.

14. A system for mitigating co-channel interference (CCI) caused due to narrow multiband signal in white space (WS) modems, comprising:
a customer premises equipment (CPE) that comprises:
one or more CPE receivers that receive an orthogonal frequency division multiplexing signal (OFDM) from a base-station transmitter, wherein said one or more CPE receivers comprise:
an interference detection module that detects a presence of said co-channel interference (CCI) in carriers of said OFDM signal and determines co-channel interference affected carriers by identifying central interference carriers corresponding to said co-channel interference affected carriers, wherein said co-channel interference is represented in said carriers using at least one of (i) a position, (ii) a spread, or (iii) an interference power, of said co-channel interference affected carriers; and
a dynamic notch filter module that (i) receives said central interference carriers from said interference detection module and (ii) mitigates said co-channel interference of said co-channel interference affected carriers without affecting frame detection capability by suppressing said interference power of said co-channel interference affected carriers;
one or more CPE transmitters that comprise an interference aware frequency interleaver that spreads said co-channel interference affected carriers based on interference specific interleaving parameters and frequency de-interleaving is performed corresponding to a frequency interleaving in said one or more CPE receivers.

15. The system of claim 14, wherein said dynamic notch filter module
converts said position of said co-channel interference affected carriers into baseband frequency values to calculate notch frequencies;
calculates notch filter co-efficient based on said notch frequencies; and filters said co-channel interference of said co-channel interference affected carriers from an output of analog to digital (A/D) converter based on said notch filter co-efficient.

16. The system of claim 14, wherein said interference aware frequency interleaver
pre-determines said interference specific interleaving parameters that control said spread of said frequency de-interleaving; and
stores said interference specific interleaving parameters in a lookup table,
wherein said interference aware frequency interleaver comprises an interference aware interleaver selection module that determines an interference profile based on central interfering carrier indices of said narrow multiband signal to select an appropriate interference specific interleaving parameters based on said lookup table, wherein said interference aware interleaver selection module selects said appropriate interference specific interleaving parameters from said lookup table using said central interference carriers based on (a) said position of said co-channel interference affected carriers and (b) said interference profile,
wherein said selected interference specific interleaving parameters are added into said WS modems when an interference flag associated with said OFDM signal is high.

17. The system of claim 14, wherein said WS modem utilizes a turbo-like interleaving (TLI) algorithm for said frequency interleaving to generate a permutation rule L(x) using parameters, wherein said parameters comprise (a) interleaving block size K, (b) integers p and q and (c) number of iterative calculations j in said TLI algorithm, wherein an output sequence is generated at each step of iteration, wherein a value of said permutation rule L(x) in an input sequence corresponds to x in said output sequence, wherein an index pattern is calculated at an output of iteration m using an equation $$I_{p,q,K}^{(m)}(x) = [K - p + x + q \cdot p \cdot [-x - p \cdot I_{p,q,K}^{(m-1)}(x)] \bmod K] \bmod K,$$

wherein said index pattern is utilized as said permutation rule after j iterations using an equation $L(x) = I_{p,q,K}^{(j)}(x)$, wherein a performance of said TLI algorithm is characterized by an interleaving spread depth $\Delta L(\Delta x)$ that is calculated for indices x and $x + \Delta x$ in said output sequence using an equation $$\Delta L(\Delta x) = \min_{0 < x < K-1} |L(x + \Delta x) - L(x)|.$$

18. The system of claim 16, wherein said pre-determining said interference specific interleaving parameters comprises the steps of:
(a) setting a value for said integer q to determine combinations of values for said integer p and number of said iterative calculations j for which said interleaving spread depth $\Delta L(\Delta x)$ is greater than 60% of maximum possible interleaving spread depth;
(b) tracing said position of said co-channel interference affected carriers into each forward error correction (FEC) block to determine number of data positions of said co-channel interference affected carriers in each said FEC block;
(c) determining maximum number of said co-channel interference affected carriers present in said FEC block;
(d) selecting said appropriate interference specific interleaving parameters which minimize said maximum number of said co-channel interference affected carriers present in said FEC block to spread interference affected data across all FEC modules to recover an error prone data;
(e) repeating said steps (a) to (d) for each value of said integer q, wherein said combination of said interference specific interleaving parameters spread said co-channel interference affected carriers effectively across a spectrum of said narrow multiband signal;
(f) running simulations with said interference specific interleaving parameters for different channel conditions and determine said interference specific interleaving parameters that provide best performance for all modulations and code-rates for at least one interference profile; and
(g) repeating said steps (a) to (f) for different possible interference profiles, wherein said lookup table is generated to store said best performing of said interference specific interleaving parameters for each interference profile after determining said interference specific interleaving parameters.

19. The system of claim 14, wherein said co-channel interference in said OFDM signal is suppressed to provide entire dynamic range of fast fourier transform (FFT) to be available for said OFDM signal.

20. The system of claim 14, wherein said interference detection module detects said presence of said co-channel interference (CCI) in said carriers of said OFDM signal by performing the steps of:
obtaining $2^N$ fast fourier transform (FFT) samples where $2^N$ represents FFT block size in said interference detection module;
multiplying said $2^N$ FFT samples with a complex conjugate of a previous block of said $2^N$ fast fourier transform (FFT) samples;
normalizing output samples by dividing absolute value of said $2^N$ FFT samples using a norm of a vector;
accumulating and adding said vector across M blocks of said $2^N$ fast fourier transform (FFT) samples using a first equation $$\text{Corr\_sum} = \sum_{i=1}^{M} \frac{\text{abs}(\text{FFT\_out}_i(1:2^N) \cdot \text{FFT\_out}_{i-1}^*(1:2^N))}{|\text{FFT\_out}_i(1:2^N) \cdot \text{FFT\_out}_{i-1}^*(1:2^N)|},$$

wherein $\text{FFT\_out}_i$ is a slot i of FFT output, wherein said Corr_sum comprises peaks at carrier positions of said co-channel interference; and
determining said position of said co-channel interference in said carriers using a second equation:

interference_carrier_positions = $\{i \in (1:2^N) | (\text{Corr\_sum}(i) - \text{mean}(\text{Corr\_sum})) > \text{threshold1}\}$.

21. The system of claim 20, wherein said co-channel interference is detected in said carriers when said interference_carrier_positions is not a null set and said interference flag is set to 1, wherein said threshold1 is determined based on simulations in different channel conditions and is selected such that probability of false detection of said co-channel interference is minimal.

22. The system of claim 14, wherein said system identifies said one or more CPE that are affected by said co-channel interference and changes frequency interleaving parameters related to said one or more CPE affected by said co-channel interference, wherein said one or more CPE need different set of said frequency interleaving parameters as said one or more CPE are situated at different independent locations.

23. The system of claim 22, wherein said one or more CPE
- transmit said interference flag and said central interference carriers to said base-station, wherein said base-station runs said interference aware interleaver selection module separately for each CPE to select said appropriate interference specific interleaving parameters for each of said CPE,
- wherein said OFDM signals comprise a generic control structure data that are interleaved using said default frequency interleaving parameters as said generic control structure data is shared across said one or more CPE, wherein said OFDM signals specific to each of said CPE are interleaved with CPE specific set of frequency interleaving parameters.

24. A method for mitigating co-channel interference (CCI) caused due to narrow multiband signal in white space (WS) modems, comprising:
- receiving an orthogonal frequency division multiplexing signal (OFDM) from at least one of (a) one or more customer premises equipment (CPE) uplink transmitters or (b) a base-station downlink transmitter;
- detecting, using an interference detection module, a presence of said co-channel interference (CCI) in carriers of said OFDM signal and determining co-channel interference affected carriers, comprising:
  identifying central interference carriers corresponding to said co-channel interference affected carriers, wherein said co-channel interference is represented in said carriers using at least one of (i) a position, (ii) a spread, or (iii) an interference power, of said co-channel interference affected carriers;
- receiving, using a dynamic notch filter module, said central interference carriers from said interference detection module;
- mitigating, using said dynamic notch filter module, said co-channel interference of said co-channel interference affected carriers without affecting frame detection capability of a system, wherein said mitigating comprises suppressing said interference power of said co-channel interference affected carriers; and
- spreading, using an interference aware frequency interleaver, said co-channel interference affected carriers based on interference specific interleaving parameters and performing frequency de-interleaving corresponding to a frequency interleaving in at least one of (a) a base-station uplink receiver or (b) one or more CPE downlink receivers.

* * * * *